US009414248B2

(12) United States Patent
Kovvali et al.

(10) Patent No.: US 9,414,248 B2
(45) Date of Patent: Aug. 9, 2016

(54) SYSTEM AND METHODS FOR ESTIMATION AND IMPROVEMENT OF USER, SERVICE AND NETWORK QOE METRICS

(71) Applicant: Movik Networks, Inc., Westford, MA (US)

(72) Inventors: Surya Kumar Kovvali, Westborough, MA (US); Charles W. Boyle, Upton, MA (US); John Hutchins, Groton, MA (US); Nizar Purayil, Bangalore (IN); Mythili Vutukuru, Secunderabad (IN)

(73) Assignee: Movik Networks, Inc., Westford, MA (US)

( * ) Notice: Subject to any disclaimer, the term of this patent is extended or adjusted under 35 U.S.C. 154(b) by 300 days.

(21) Appl. No.: 14/212,600

(22) Filed: Mar. 14, 2014

(65) Prior Publication Data

US 2014/0269269 A1 Sep. 18, 2014

Related U.S. Application Data

(60) Provisional application No. 61/790,468, filed on Mar. 15, 2013, provisional application No. 61/790,563, filed on Mar. 15, 2013, provisional application No. 61/793,106, filed on Mar. 15, 2013.

(51) Int. Cl.
*H04L 12/26* (2006.01)
*H04W 24/08* (2009.01)
(Continued)

(52) U.S. Cl.
CPC ........... *H04W 24/08* (2013.01); *H04L 41/5009* (2013.01); *H04W 24/04* (2013.01); *H04L 43/0864* (2013.01); *H04L 43/0888* (2013.01); *H04W 40/12* (2013.01)

(58) Field of Classification Search
CPC H04W 40/12; H04L 43/0864; H04L 43/0888
USPC .............................. 370/252–253, 230–238.1; 455/67.11–67.14, 115.1–115.4; 709/223–226, 230–235
See application file for complete search history.

(56) References Cited

U.S. PATENT DOCUMENTS 8,565,076 B2 10/2013 Kovvali et al.
8,576,744 B2 11/2013 Kovvali et al.
(Continued)

OTHER PUBLICATIONS

3GPP TS 32.450, V 11.0.0 (Sep. 2012), Technical Specification, 3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 11), 2012, 17 pages.

(Continued)

*Primary Examiner* — Thai Hoang
(74) *Attorney, Agent, or Firm* — Nields, Lemack & France, LLC

(57) ABSTRACT

Methods for estimating Subscriber quality of experience (QOE) for mobile users accessing networks for different services from observed data in control and user planes in mobile wireless networks and then summarizing inferences per user, per service, per sector, group of sectors and other aggregate points, and exporting this information for reducing user churn, network planning and network tuning, application adaptation to improve QOE are disclosed. Methods for improving subscriber QOE metrics for certain applications, services and web-sites for improved monetization methods are also presented. The methods facilitate quantifying network goodness from the user application point of view, and exporting triggers to other network elements, such as SON Server, OSS and PCRF, when QOE anomalies are detected. Additionally, this exported information could also trigger content adaptation, delivery optimizations and other actions. Finally, client, server and intermediary enhancements to improve QOE of certain applications in delay/capacity varying networks are presented.

14 Claims, 10 Drawing Sheets

Example deployment of transit network device in LTE

(51) Int. Cl.
*H04W 24/04* (2009.01)
*H04L 12/24* (2006.01)
*H04W 40/12* (2009.01)

(56) References Cited

U.S. PATENT DOCUMENTS

| | | | | |
|---|---|---|---|---|
| 8,626,115 | B2* | 1/2014 | Raleigh | H04L 63/20 455/405 |
| 8,644,176 | B1* | 2/2014 | Shah | H04L 47/10 370/252 |
| 2008/0162710 | A1* | 7/2008 | Mundra | H04L 12/2809 709/230 |
| 2010/0091677 | A1* | 4/2010 | Griff | H04L 41/12 370/252 |
| 2010/0195503 | A1* | 8/2010 | Raleigh | H04W 28/0268 370/235 |
| 2011/0167170 | A1 | 7/2011 | Kovvali et al. | |
| 2012/0023226 | A1* | 1/2012 | Petersen | H04W 4/028 709/224 |
| 2012/0101952 | A1* | 4/2012 | Raleigh | G06Q 30/016 705/304 |
| 2012/0184258 | A1 | 7/2012 | Kovvali et al. | |
| 2013/0021933 | A1 | 1/2013 | Kovvali et al. | |
| 2013/0143542 | A1 | 6/2013 | Kovvali et al. | |
| 2013/0258865 | A1 | 10/2013 | Kovvali et al. | |
| 2016/0057651 | A1* | 2/2016 | Backholm | H04W 28/0284 370/235 |

OTHER PUBLICATIONS

3GPP TR 32.814, V 7.0.0 (Mar. 2007), Technical Report, 3rd Generation Partnership Project; Technical Specification Group Services and System Aspects; Telecommunication management; UTRAN and GERAN Key Performance Indicators (KPI) (Release 7), 2007, 25 pages.

ACM Sigmobile, Jul. 2001, "TCP Westwood: Bandwidth Estimation for Enhanced Transport over Wireless Links", pp. 287-297, Mascolo, et al.

Huawei Technologies Co., Ltd., ETSI World Class Standards QoS QoE User Experience Workshop, Sep. 21-22, 2010, "Bridging QoE and QoS for Mobile Broadband Networks", 45 pages, Dr. David Soldani, VP Huawei European Research Centre.

Huawei Technologies Co., Ltd., Capacity Sharing Workshop, Oct. 13, 2011, Institute of Communication Networks and Computer Engineering (IKR)—University of Stuttgart, Germany, "Bridging QoE and QoS for Mobile Broadband Networks", 30 pages, Dr. David Soldani, Huawei European Research Centre, Munich, Germany.

* cited by examiner

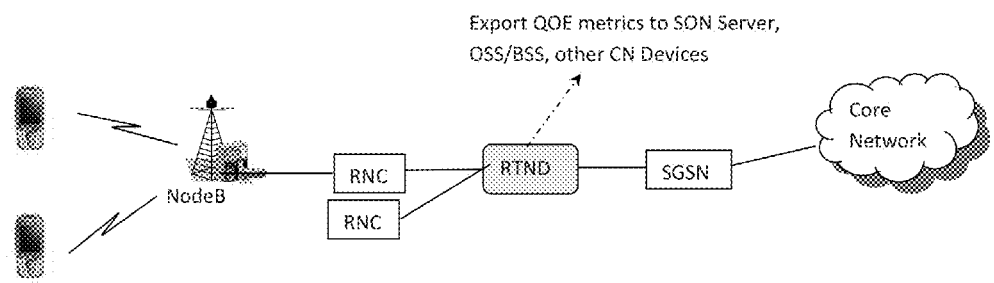
Figure 1: Example deployment of a transit network device (RTND) in UMTS
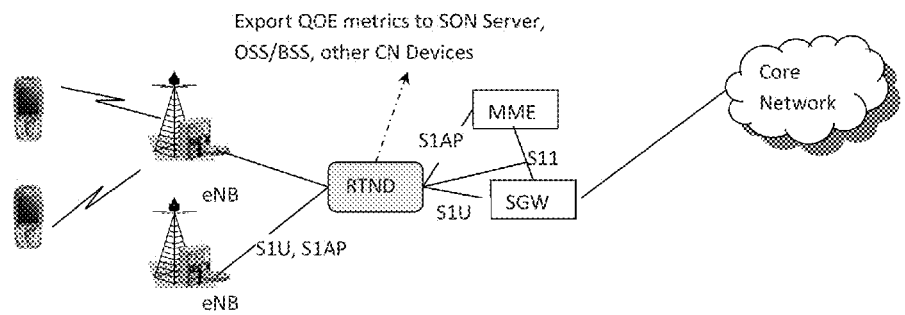
Figure 2: Example deployment of transit network device in LTE

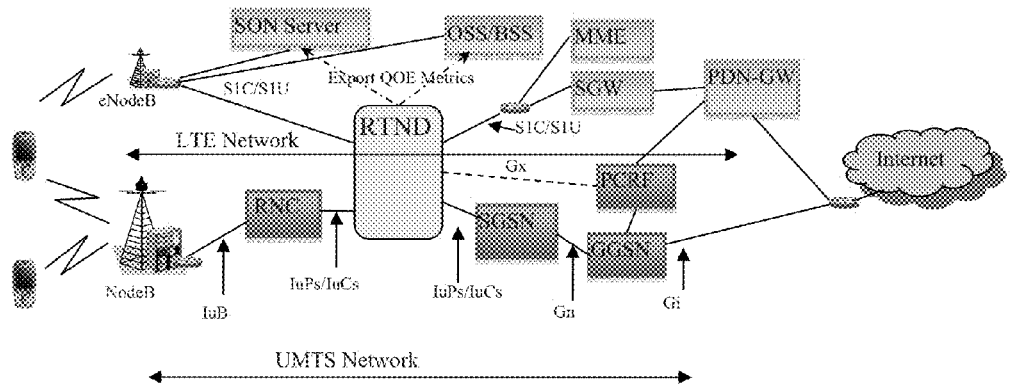
Figure 3: Example configuration of RAN Transit Network Device in intercepting mode in UMTS & LTE Networks
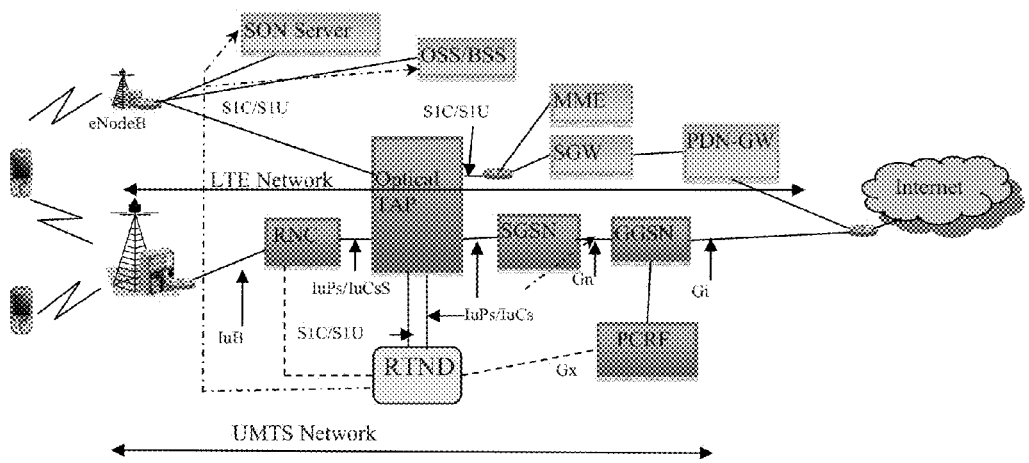
Figure 4: RTND deployment in monitoring mode using Optical-TAP in UMTS & LTE Networks

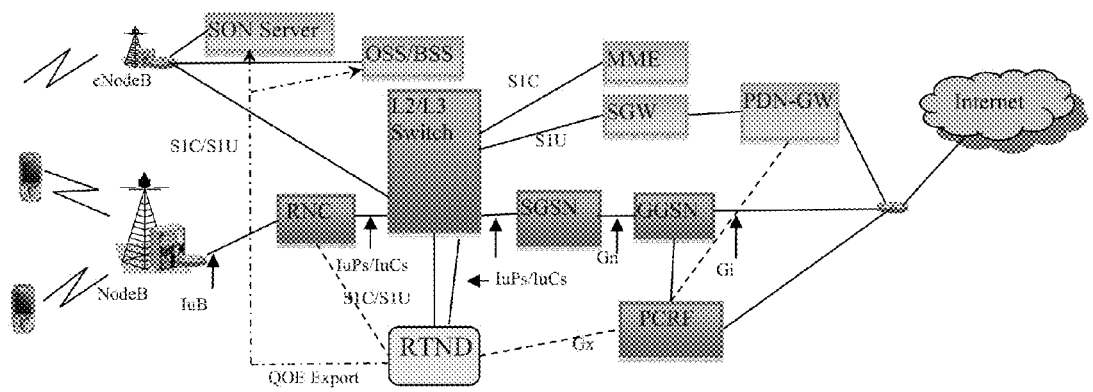
Figure 5: RTND deployment in monitoring mode using Port Mirroring from L2/L3 Switch in UMTS Network

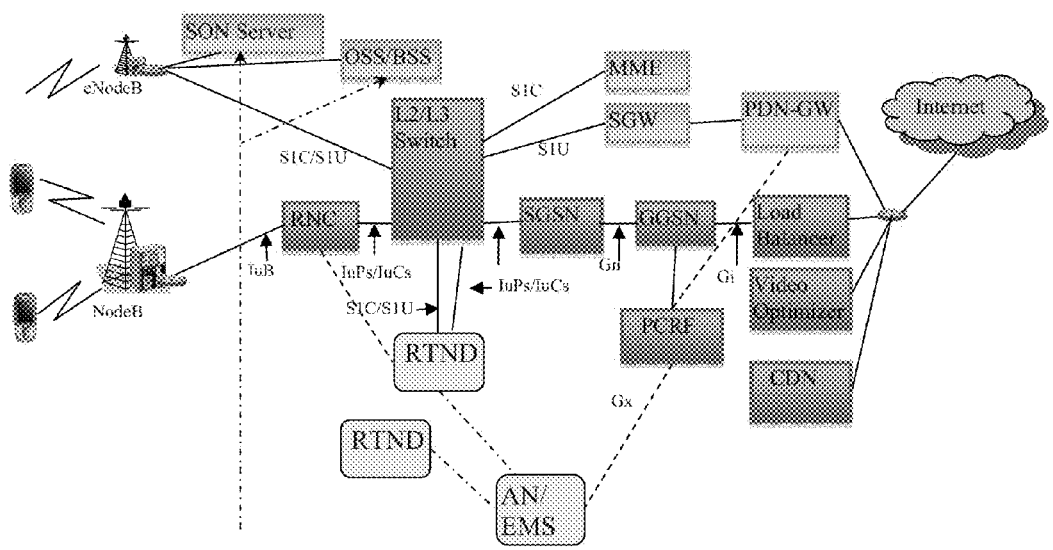
Figure 6: RTND exporting consolidated correlated information to Aggregation Node (AN) or Element Management System (EMS)

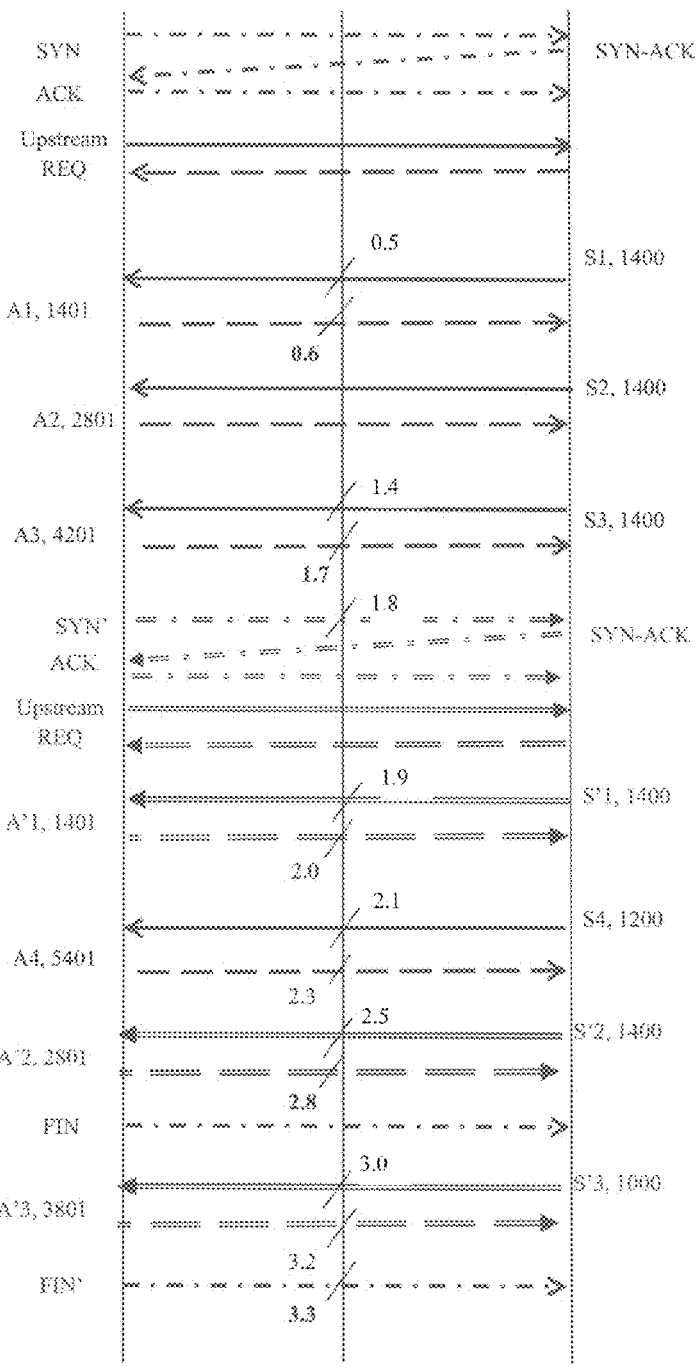
Notes:
a) The number next to the segment # indicates the size of the segment (not sequence #).
b) Not all the messages for TCP termination are shown.
Figure 7 Computing Non idle time user throughput for multiple TCP connections

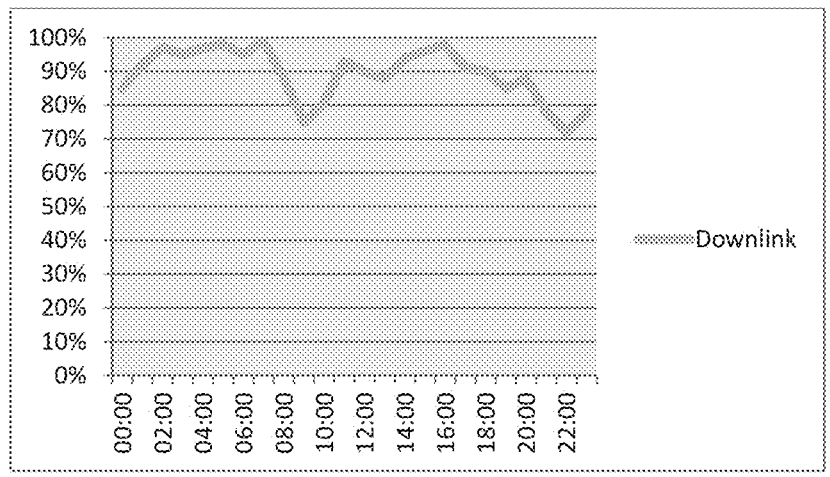
Figure 8: Roll-up of downlink NIUT for a sector, with number of users with NIUT > 200 Kbps

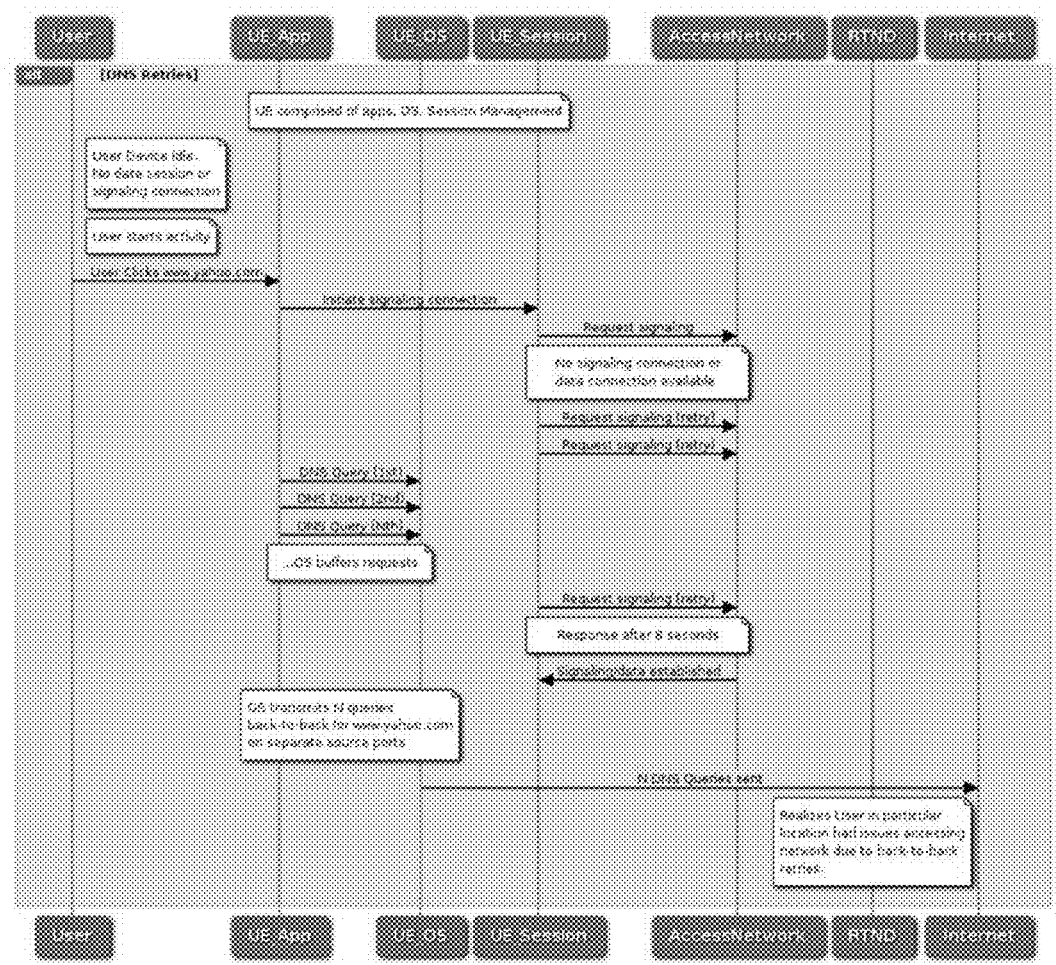
Figure 9: Accessibility estimation based on DNS Retries when an idle mode user initiates internet session

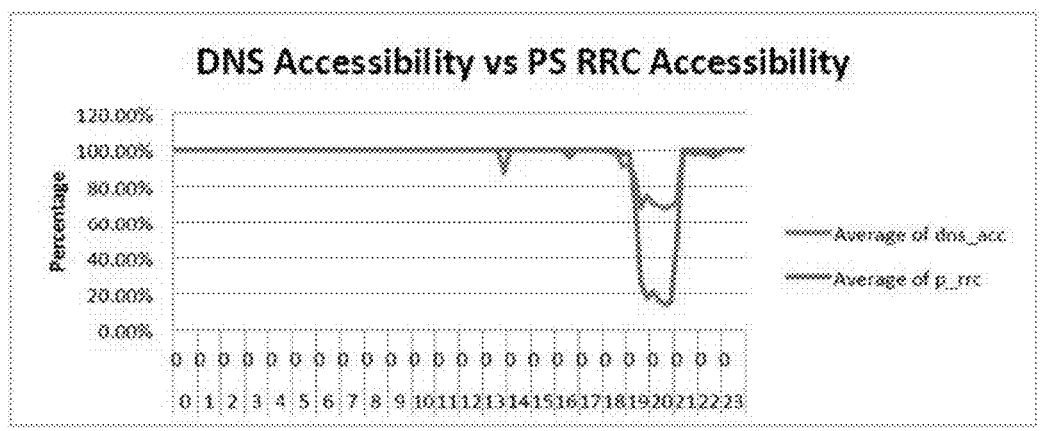
Figure 10: Accessibility estimated based on DNS Retries vs. Accessibility computed using RRC data in RNC/eNB per 3GPP KPIs

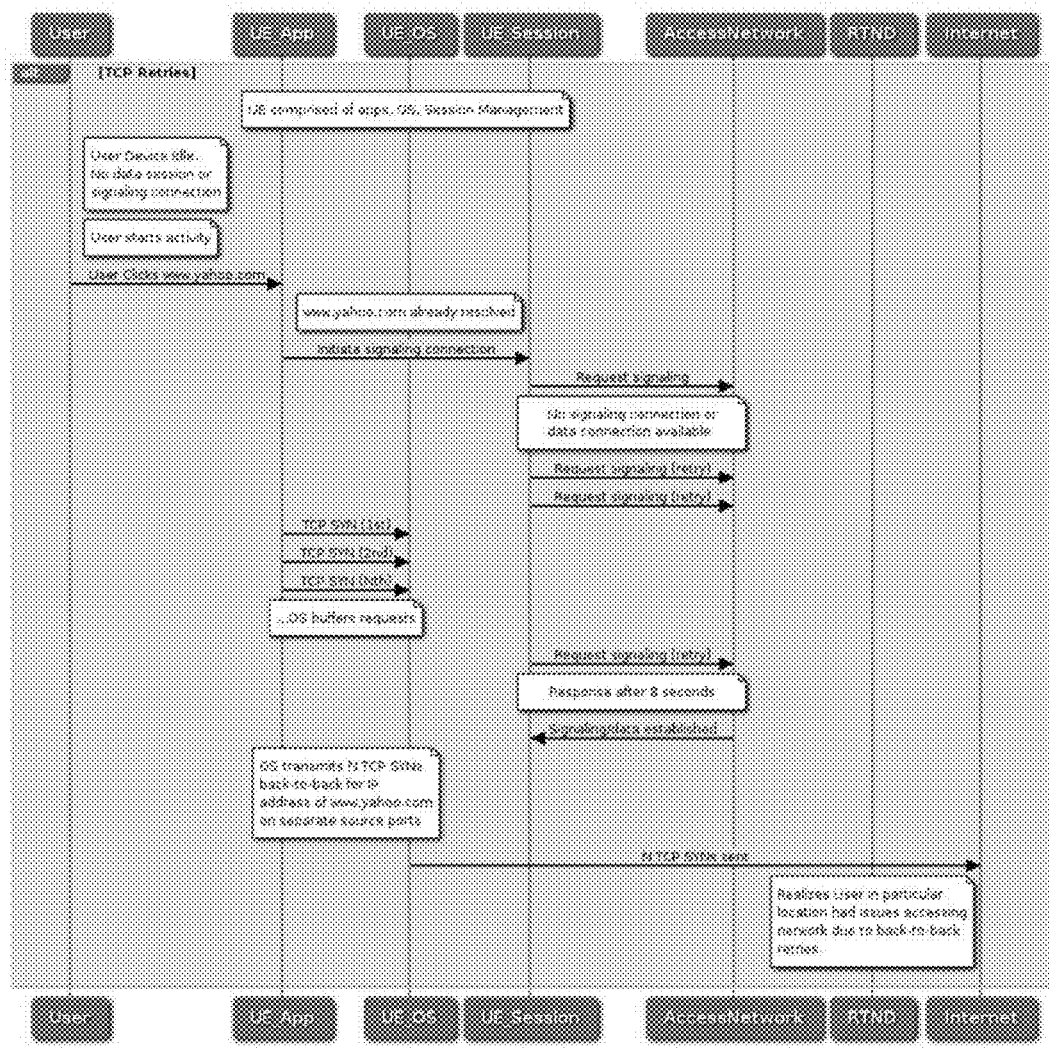
Figure 11: Accessibility estimation based on TCP-SYN Retries when an idle mode user initiates Internet session

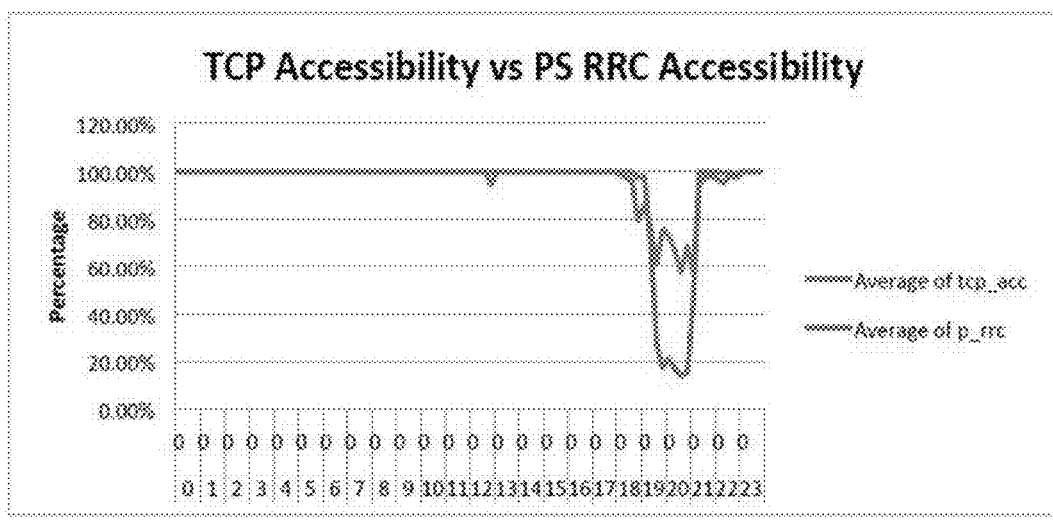
Figure 12: Accessibility estimated based on TCP-SYN retries vs. Accessibility computed from PS-RRC information per 3GPP

SYSTEM AND METHODS FOR ESTIMATION AND IMPROVEMENT OF USER, SERVICE AND NETWORK QOE METRICS

This application claims priority of U.S. Provisional Patent Application Ser. Nos. 61/790,468, filed Mar. 15, 2013; 61/790,563, filed Mar. 15, 2013; and 61/793,106, filed Mar. 15, 2013, the disclosures of which are incorporated herein by reference in their entireties.

BACKGROUND

Quality of Experience by the user when using applications through a network is dependent on the type of application, and its behavior in dealing with packet loss, delay, jitter, and bandwidth variations introduced by the network. For some applications such as Voice and Video, prior-art methods define computing MOS (Mean Opinion Scores) as a measure of user's quality of experience using client side applications or estimating the MOS scores based on what client reports via control protocols such as RTCP and RTCP XR. For example, using RTCP, the client reports packet loss, delay, jitter and other parameters. These parameters can be used in conjunction with the E-model to compute a transmission rating-factor, "R", and corresponding MOS score. An application server or a monitoring device that monitors RTCP could estimate video or voice MOS scores for such applications.

However some network deployments do not enable the use of RTCP, or RTCP streams may be encrypted, thus preventing transit network devices from estimating the MOS Scores. If RTCP streams are encrypted, the server that terminates the RTCP stream could estimate the MOS score; however, an intermediate monitoring device that taps application flows could not decode the encrypted streams, and thus could not estimate the MOS scores.

Additionally, MOS scores for Voice and Video in the prior art methods are defined for active call (when the service is active), and does not include other parameters, such as how long it took for a user to establish a call, or if a call is dropped during the middle and re-established. Also, MOS Scores for Video measure the Mean Opinion Score in the Receiver (Client) at the MPEG/Video content level, and do not estimate the quality of delivery by the transit network. 3GPP standards define network performance KPIs, such as, "Accessibility, Retainability, Availability, Integrity and Mobility" that characterizes the network goodness based on the data from network elements, such as Base Station, NodeB, eNB, RNC, etc. Per the standards, the network elements maintain performance metrics of key functional components, such as IP Throughput, RRC Success Rate, RAB Establishment success rate, etc., and periodically report them to an OSS. The OSS system computes the 3GPP defined Network functional KPIs, such as Accessibility and Retainability from the received performance data. For example, 3GPP 32.814 defines Accessibility to be computed from the RAB Establishment Success Rate and RRC Success Rate.

However these metrics do not facilitate characterizing per user QOE; per user QOE is dependent on the type of service/application that the user is using; some applications/services are more sensitive to delay and others more dependent on bandwidth, packet loss etc. In wireless access networks, the delay and capacity are highly varying due to coverage, capacity, interference, and congestion at one or more aggregation points. Therefore, the delay, jitter, and packet loss experienced by each direction of stream varies significantly.

A transit network device that transparently monitors application flows and estimates Quality of Experience by each flow, and rolls up estimated QOE per service, per user and per aggregation points such as a Sector, NodeB/eNodeB/RNC, Aggregation Router, Media Gateway etc., and reports QOE degradation would benefit network operators significantly. This would allow network operators to move services to alternate networks, initiate network tuning via 3GPP/SON (Self Optimizing Network) methods, identify problem locations, and characterize network goodness as a function of "Happy Users" for these services; all of which serve to maximize user QOE and reduce churn.

Thus, a method and device that enables this transparent monitoring of application flows and estimates QoE per flow, per serve, per user and per aggregation points would be beneficial.

SUMMARY

US Patent Publication 2013/0258865, entitled "Distributed RAN Information Collection, Consolidation And Analytics" identifies methods for collecting data from different geographical locations or aggregation points such as RNC, reducing such data for summarization, consolidation, storage size reduction, propagating to few aggregation points, and performing RAN analysis function. US Patent Publication 2013/0021933, entitled "RAN Analytics, Control and Tuning via Multi-Protocol, Multi-Domain, and Multi-RAT Analysis", discloses correlating control and user plane information from plurality of network interfaces, from multiple Radio Access Technologies in a wireless Mobile Network, generating consolidated metrics per function (functional KPIs) such as Sector Utilization and Subscriber Mobility Index, in real-time and exporting this information to other network elements for network tuning and optimizations. That publication identifies Subscriber Service Score Index (SSSI) as a measure of the quality of service that a subscriber is getting relative to others, based on the type of service. The current disclosure extends these methods with inference based estimation of access network congestion, for example, common channel access congestion based on the observed behavior of certain protocols such as DNS, TCP-SYN etc., when a new RAB is created. While these protocols have retransmission mechanisms to deal with packet losses in the underlying transport network, for example GTP-U over UDP/IP, the present disclosure attempts to identify retransmit behavior, such as inter-packet gap, number of retries etc., relative to the corresponding protocol rules, attempts to infer the underlying reasons, and estimates the common channel access congestion.

A second aspect of the present disclosure is to consolidate multiple performance metrics (functional KPIs) to per user-service QOE metrics within a location or aggregation point, and per user QOE metrics across multiple services in a time period and then to estimate the proportion of happy users in a location or aggregation point. For example, the present disclosure generates per user QOE metrics as a "Happy User Index" across all services/applications that a user initiates in an observation period, and computes the percentage of happy users at different locations such as sectors, NodeBs and groups of sectors in a stadium etc. The per user QOE is identified per each service type, for example:

(1) SMS-QOE
(2) CS-QOE
(3) QOE for Voice over LTE (VOLTE)
(4) QOE for Video Calls over LTE
(5) QOE for Rich communication Services (RCS-QOE)
(6) PS-QOE
   a. Web-Browsing QOE
   b. Instant Messaging QOE c. Multi-Media Download QOE (QOE during video play)
d. Multi-Media Upload QOE (QOE during video upload)
e. Software Update QOE
f. Gaming QOE
g. Non-Idle time TCP throughput
h. MMS Upload QOE
i. Mail QOE (7) Multi-domain QOE (Packet Switched Session with overlapped Circuit Switched Call) in UMTS network.

(8) Multi-service QOE: for example multiple services with different QCI values are used simultaneously by the user.

(9) TCP Network Quality Metric—Quality metric computed per aggregation point, such as Sector, Base Station, Set of Base-stations in a geographical Area, RNC etc., that is computed based on Non-Idle Time User Throughput.

The present disclosure defines a parameter, referred to as "Non-Idle time User throughput (NIUT)", as throughput over a plurality of TCP connections to a user when there are outstanding TCP data segments which are not acknowledged by the receiver. In other words, any idle times such as "server think time", "client think times", and idle times between TCP connections when there are no outstanding segments by the TCP sender, are not included in the NIUT computation.

A third aspect of the present disclosure is to roll-up individual user QOEs to groups of users based on the portions of access networks they are sharing (for example, users in a sector or NodeB), or group of sectors in a specific zone in a venue, or set of sectors covering a University etc. The grouping of sectors to zones or venues could be via manual configuration, importing sector/NodeB neighborhood map, or by constructing neighborhood map from user plane and control plane as identified in U.S. Pat. No. 8,565,076. The rolled up user QOEs per such aggregate may be characterized as a percent of users with QOE=1, 2, 3, 4, 5 or as cumulative distribution of users with QOE 5, 4, 3, 2, 1. Happiness factor for such aggregation point is then estimated as the percentage of users with a QOE of at least 3.

A fourth aspect of the present disclosure is rolling up user QOEs per service or application type, such as web-browsing. US Patent Publication 2013/0021933 teaches a method of estimating Subscriber application index (SAPI) from monitoring control-plane and user-plane messages. Rolling up user QOEs per application type, to determine service QOE percentiles (or CDF) are described in the present disclosure.

A fifth aspect of the present disclosure is rolling up user QOEs per 3GPP QCI class and APN. QCI class per user plane tunnel is identified from monitoring control plane protocols as identified in US Patent Publication 2013/0021933. Estimating QOE percentiles (or CDFs) per QCI class are identified in the present disclosure.

The estimated subscriber or aggregate metrics are exported to other network elements, such as the PCRF, OSS, Monitoring and reporting platforms, BSS/Analytics Engine, ANDSF Server, SON Server, Performance Enhancing Proxies, CDN Device, Origin Server, etc. The exported metrics facilitate network planning in identifying coverage holes, capacity bottlenecks, inter-cell interference, evaluating new application/service rollouts, comparing networks etc. Such exports could be in real-time based on thresholds, allowing for automatic network optimizations, content adaptation and control, moving users to alternate networks, evaluating effectiveness of policies and optimizations by comparing metrics before and after the policy and optimization triggers. For example, an operator may configure a device that incorporates the methods described herein to export a trigger when enterprise class users' QOE when accessing VPN or mail services degrades to 2 or 1. The configured device then estimates QOE for these users and generates export triggers when the condition is detected. Other network devices in the operator network such as PCRF, could initiate actions to improve QOE for these users and/or the application. These actions may include modifying the QCI class or improve average QOE in a sector, changing priority for certain services, marking certain flows with IP/TOS/DiffServ fields in the GTP tunnel Header in transport protocol or user IP headers, or moving users to alternate networks.

It is important to note that marking IP headers to indicate flow priorities, and using different QCI classes for different types of services is known in the prior art. The present disclosure, however, uses the prior art IP marking or QCI modifications based on estimated User Application QOE, or Sector or aggregate metrics based on recent CP/UP traffic flows to the user, traffic flows in the sector, eNB, group of sectors that the user is located. For example, an enterprise class user's services, such as Mail, VPN, etc., uses default bearer (QCI=9) and gets best effort service competing with other users in the network normally. When the QOE for such user's important applications fall below a threshold, then operator policy could trigger using higher priority dedicated bearers with different QOS parameters. The 3GPP PCC architecture defines PCRF or AF (Application Function) initiating QOS changes to user sessions, specific IP flows etc. For example, a VOD server could interact with PCRF when the user logins to the server and initiates a streaming video session. The present disclosure facilitates initiating triggers when estimated QOE for premium users/services degrades below defined thresholds.

Additionally, controlling the object downloading and uploading through delay and capacity varying networks by client applications such as web-browsers, transit caches using protocol extensions is another embodiment of the present disclosure. The disclosure identifies methods by which a web-server, web-cache or a transit network device could specify within a html page requested by client or transit device, whether the device should use objects previously cached objects, or not fetch at all, or should be fetched if the transit network conditions are favorable or substituted with other previously fetched objects depending on the client's access conditions to the server or the transit network. To achieve this goal, the present disclosure describes enhancements to HTTP methods to select alternative resolutions for large objects (such as photos, videos etc.), and continuing interrupted transfers during network outage due to network coverage, network and server congestions, etc. Such enhancements may be triggered based on user QOE or network KPIs, by server or proxy.

BRIEF DESCRIPTION OF THE DRAWINGS

FIG. 1 is an example configuration showing a RAN Transit Network Device, or RIND, that incorporates the methods disclosed herein, deployed as an inline device logically intercepting IUPS and/or IUCS interfaces in UMTS network. The device may be used to estimate the user, service, aggregate (sector, NodeB, or RNC) QOE metrics and export the consolidated metrics to other network elements. Alternatively, it may use the consolidated metrics to perform one more actions identified herein.

FIG. 2 is an example deployment where the RIND is disposed in a LTE network and intercepts S1AP, S1U, and S11 interfaces. Similar to FIG. 1, the RIND may export consolidated metrics to external devices, or may perform actions if it is enabled to modify transit network traffic on the interfaces that it is intercepting.

FIG. 3 shows a RIND deployment intercepting UMTS and LTE interfaces and exporting consolidated per user, per service, aggregate QOE metrics to other network elements for external actions as disclosed herein. Alternately, the actions may be performed within the RIND if it is enabled to modify network traffic that it intercepts.

FIG. 4 shows a RIND deployment in monitoring mode using an optical tap interface. In this configuration, the RIND receives a copy of the packet flows from logical interfaces, and is not able to alter the flows. The RTND exports consolidated QOE metrics identified herein to other network elements.

FIG. 5 is a variation of FIG. 4, where the RTND receives copies of packet flows from a transit network switch or router that uses port mirrors to replicate traffic.

FIG. 6 shows the RTND receiving traffic flows from multiple logical interfaces and exporting information to an Aggregation Node (AN) and/or Element Management System (EMS). The AN/EMS receives information from multiple RTNDs, further consolidates the received metrics and exports the consolidated metrics to other Network Elements. This mechanism facilitates consolidating metrics when users from the scope of one RTND move to another, or each RTND intercepts specific RATs (Radio Access Technologies), or receives portion of the logical interface traffic.

FIG. 7 illustrates the computation of "Non Idle Time User Throughput (NIUT)" per the algorithm described herein. The figure illustrates an example sequence in which NIUT is computed per user over multiple TCP connections.

FIG. 8 shows the aggregate (rolled-up) downlink Non-Idle Time User Throughput (NIUT) per sector, showing the number of users getting >200 Kbps in a sector. Since idle times are not counted, this figure shows, between Hours 08:00-10:00 and 20:00-24:00, more numbers of users are not getting at least 200 Kbs when their applications are actively generating traffic.

FIG. 9 is a detailed sequence of steps in estimating access network congestion based on inference of the application protocols, and the sequence of steps in the client when users activates an application. The figure shows the protocol steps when the user device is in idle state (i.e., no Radio Bearer connection exists between the device and Access Network node such as, NodeB/RNC/eNB/AccessPoint), and user initiates browsing session to www.yahoo.com. The figure shows burst of DNS requests sent after Radio Bearer is established as a metric for estimating access channel congestion.

FIG. 10 compares user accessibility KPI as estimated by the inference based methods disclosed herein to the Packet Services Accessibility (PS Accessibility) estimated using the RRC information in the NB/RNC/eNB per the 3GPP specification. It is important to note that the RTND does not have RRC level information to compute the access channel congestion in the RAN; thus it is using inferences from the observed protocols.

FIG. 11 is a detailed sequence of steps in estimating access network congestion based on TCP-SYN retransmissions by the user device. This sequence happens when the user device cached DNS name to IP Address translation, or connects to a public IP address, for example to an enterprise VPN. Similar to FIG. 9, the figure shows sequence of steps in the user device and the communication network to the server, when the user initiates a service when there is no active RAB.

FIG. 12 compares user accessibility KPI as estimated by the inference based methods disclosed herein using TCP-SYN retries and compares with PS Accessibility metric as computed from RRC information in NB/RNC/eNB per the 3GPP specification.

DETAILED DESCRIPTION

The present disclosure identifies methods to consolidate protocol, flow level and service level accessibility, retainability, availability, mobility and integrity KPI metrics estimated by monitoring plurality of protocol flows (S1AP, S11, SIP, RTP, RTCP, HTTP) corresponding to service (VOLTE voice call, VOLTE Video Call, RCS etc.) to generate a consolidated QOE metric per user and service. The individual per user service metrics are then rolled-up as scores per aggregation points to network QOE KPI (Key Performance Indicator) end exported to other network elements. Additionally, the present disclosure extends the metrics identified in US Patent Publications 2013/0143542 and 2013/0258865 by inference based methods based on anomalies observed in the user device behavior for certain protocols such as DNS, TCP-SYN on newly established RABs.

While QOE metrics for Voice and Video applications are defined as MOS scores in prior-art methods, for other applications, such as Web-Browsing, Photo-uploads, SMS, Instant Messages (IM) and others, comprehensive QOE metrics have not been defined. Thus, it is not possible to characterize what the throughput, latency, reliability (low packet loss) that the network is providing to the user application, when the user application or server has data to send to that user. For packet services, such as connections to internet, the throughput to the user, and/or packet drops, or TCP retransmissions, or roundtrip delay to a website (for example using PING) are prior-art methods to characterize the network connectivity. However, there is no consolidated metric that identifies the service quality that an access network is providing to the user. For example, using throughput as a metric for service quality is problematic. Low throughput to a user in a given period could be due to multiple factors, such as the application may be queuing the packets at a low rate, the server is congested, the server is pacing packets, the NodeB is not switching user to HSPA due to low packet rate by the user application or other causes. Also transport protocols, such as TCP and many data/internet applications, are flexible in the sense that they could tolerate some amount of variations in delay, bandwidth, bit errors, adjusting to ramp-up to use the available bandwidth, or selective retransmissions or Adaptive bit rate methods; however such adaptation translates to poor quality of experience to user, for example, due to a web page downloading too slowly, or frequent video stalls. Thus, metrics, such as packet drops, jitter, throughput do not accurately reflect quality of experience of a user application. A consolidated metric that characterizes what throughput the user is getting when his applications are generating load, and what the network is providing to meet the application expectations reasonably, assists the operator to select alternative networks, tune the network, and compare before and after such actions. Thus, the consolidated user QOE metrics identified in the present disclosure use a plurality of control plane and user plane information, such as RAB duration, RAN Side RTTs, RAB drop Cause codes, non-idle time TCP throughput, type of user application, TCP retransmissions, and TCP connection failure reasons. Depending on the deployment configuration, all the information per user QOE metric may not be available; in such configurations, the present disclosure describes methods using the remaining available information to estimate the metrics.

FIGS. 1 to 6 are example deployment configurations, and the present disclosure is applicable in other deployments as well. For example, in UMTS network, the RIND could be deployed to use Control and User Plane flows from Gn interface. The RIND could also be deployed on Gi interface to receive user plane traffic only and receive mapping of user IP addresses to user identities (IMSI or Network Access Identifier corresponding to the user IP address) from other network elements. In deployments where control plane information of a user is not available, some of the inputs (such as RAB release causes) identified in the present disclosure to estimate the QOE for a user will not be available. In these cases, the RIND uses the remaining inputs identified to estimate the per user QOE levels, and rolls up to aggregation levels based on the available information.

As described earlier, the methods described herein fall into three categories, namely, (1) User QOE estimation, Roll-up, and export (2) Inference based estimation of network-access congestion, (3) Application & Server enhancements for delivery over delay & capacity varying networks. These are each described in the following sections.

User QOE Estimation, Roll-Up, and Export

Network data from one or more logical protocol interfaces, such as IUPS Control and User Planes, IUCS control and User Planes, IUB, GN interfaces in UMTS RAN or similar interfaces in LTE and CDMA networks can be used to estimate QOE metrics when any of the configurations shown in FIGS. 1-6 are deployed. Also, the input data for estimating user QOE metrics may be imported from other devices such as the OSS, NodeB, RNC or others, that collect key performance metrics (known as KPIs, as defined by 3GPP Specification). The imported KPI metrics may also be used to validate estimated user QOE metrics. For example, when the estimated happiness index for CS services of a sector is low in an interval, the corresponding 3GPP KPIs, such as CS Accessibility and Retainability metric, in that observation period is expected to be low.

While the descriptions, and examples presented in this application refer to wireless mobile networks such as UMTS, LTE etc., some of the methods and procedures are applicable to other network technologies as well, where only portion of the information such as only User Plane data is available, or only control plane information is available.

The following list shows different ways in which data can be categorized and aggregated. For example, metrics can be aggregated based on geographic related data. In other embodiments, new metrics can be defined and computed.

1. Combining Sectors/NodeBs to Sector Groups and Venues—In certain locations, such as stadiums or universities, users frequently move from the coverage area of one sector to another, due to co-location of sectors, or overlapped coverage, or deployment of multiple carriers in the same location. Thus, grouping sectors where there is high short-term mobility facilitates characterizing Happy User Metrics of such an aggregate coverage area. This is achieved by:
   a. Importing Zones from Operator (Venue Sectors)—RTND imports grouping of sectors/NodeB's corresponding to a venue, such as a mall, airport, stadium etc. These groupings may be referred to zones.
   b. Automatic Grouping of Sectors/eNBs to zones or clusters of zones, based on identified mobility patterns of a number of users as identified in U.S. Pat. No. 8,565,076.
   c. Automatic or manual grouping of sectors with similar subscriber or aggregate behavioral patterns. Such behavioral patterns may include access patterns, the type of service or content accessed, geographic location, phone users of the same type, frequency of short phone calls, and others.

Each zone is a set of sectors/carriers that are shared by large volume of users. Thus, actions on some user flows in a zone may improve QOE of other users in the same zone. The RTND exports metrics with a scope of a "Zone". It identifies congestion metrics per Zone, and QOE metric of users when in a specific Zone. When a user is associated with a sector that is part of a zone, such as an Airport, his short term mobility is expected to be similar to other sectors within the zone. Thus, QOE metrics for the zone includes active users associated with any sector within the zone, until the user is associated with a sector outside the zone.

In addition, zones can also be aggregated into larger zone-groups. For example, a terminal of an airport may be a collection of neighboring sectors, and be designated as a first zone. A second terminal of the airport may be considered a second zone. The aggregation of these two zones may be considered a zone-group.

The actions to be taken based on exported consolidated zone metrics are similar to actions to be taken in sector. The rationale is a particular zone may be serviced by multiple sectors/carriers. A user parking on a sector is dependent on what is the signal strength he is getting from a sector; while in the same location, the user may park on sector 1 at time 10 AM, and may park on sector 2 at 10:02 AM. Thus, if the QOE in the zone that covers both sectors degrades due to high number of users in that zone, the number of new users should be controlled in this zone. Alternatively, users from either sector should be move to WIFI, or their content/HD should be controlled.

2. A User QOE can be computed when the user is getting SMS service. In one embodiment, the computed QOE may be a number from 1 to 5, where 5 is considered the best. For example, the SMS-QOE is computed from UMTS Control Protocol, or S1AP or SIP Protocols and uses the following parameters in these protocols:
   a. Round Trip Time interval from Service Request (SR) to SMS-Submit in the protocol for Mobile Originated SMS (MO-SMS)
   b. Delay between Service Request to CP-ACK for MO-SMS
   c. Number of Service Request Retries by the user for MO-SMS
   d. Time between the Type1-Paging Message and the Paging Response for Mobile Terminated SMS (MT-SMS)
   e. Paging Retries sent by the network before Response is received for MT-SMS
   f. Round Trip Time between sending the Type1-Paging message and receiving CP-ACK for MT-SMS
   g. For Mobile Originated SMS messages, estimate delivery completion to far-end user based on the time between sending the message to the SMS Server and receiving delivery notification completion based on message from the SMS Server.

The above parameters of SMS service of a user are combined using a decision tree method to estimate SMS-QOE as a value from 1 to 5. The per user SMS QOE metrics are then combined for estimating sector or group of sectors QOE by counting the number of users with QOE=1, QOE=2 etc. The aggregate metric for a sector is expressed as, (i) Number of total SMS users, (ii) number of users with QOE=5, (iii) Users with QOE>=4, (iv) Users with QOE>=3, (vv) users with QOE>=2, (vi) Users with QOE>=1.

3. Browsing Session QOE—This metric may be computed as a number between 1 and 5. It may be calculated using the following metrics:
   a. Identifying the browsing session of a user as the start of that user's TCP connections to HTTP, HTTPS servers, and extending until there are significant idle times (of the order of 10/20/30 Seconds) where there is no uplink or downlink traffic to the respective TCP ports. In an alternative embodiment, all tcp connection closures, and/or TCP resets for all of the user HTTP, HTTPS connections to the user can be used to denote the end of the browsing session. A plurality of the parameters observed below during the browsing session time are used to estimate browsing session QOE.
   b. Object Download Time (ODT) for short objects (<4 KB) for top level Domain Request—This is a measure of the time to download short objects
   c. Object Download-time minus the server think time, calculated by computing the time difference between the sending HTTP request and receiving the first Packet for the requested object.
   d. Page Down Load Time (PDT)—When a user accesses a website, user device sends http or https request to the corresponding web-server (for example www.yahoo.com). The webserver returns a http/https response with many embedded links, Java scripts etc., within the response. The browser parses the response packets and starts generating additional requests for the embedded links. As the browser receives http/https responses from one or more servers, it starts filling up the page presented to the user. Some browsers continue to generate additional requests by extending the page (for example, to the scrollable area within the page), or advertisement sidebar. In prior-art methods, completing the download of a page is visible in the client-browser. However, in one embodiment, the RTND observes a series of requests and responses from client and one or more servers. However, it may be unaware of which of those responses delivered correspond to completing a page down or rendering the page to the user. Therefore it may be difficult to characterize when page down load is completed. Thus, the present disclosure identifies estimating Page Down Load Time (PDT) by identifying the top level domain request to the next top level request, and/or, by the amount of downloaded data before significant gaps in requests and responses, or counting the completion time for objects that do not refer to dynamic objects (for example URL strings that refer to PHP objects). Alternatively, PDT is computed statistically by identifying top level domain requests, and percentage of bytes downloaded, or filtering objects with outlier ODTs, etc.
   e. Time to complete download of 10 KB of an object (TT10 KB), or Time for Downloading NKB of an object (TTN-KB).
   f. DNS Repeats at RAB Start, before First Response Received—This is a measure of how long the user has been trying to establish a RAB, as explained in detail below.
   g. TCP-SYN Repeats at RAB Start before first SYN-ACK received—This is a measure of how long the user has been trying to establish RAB, as explained in detail below.
   h. Number of Zero Byte RABs—This is a count of how many times a Packet Switched (PS) RAB has been established, but no bytes are transferred in uplink/downlink direction, due to RAN congestion, coverage to the user or interference.
   i. PS Bad Drops, PS Setup Failures observed in the control plane—This is a count of other failures in the control plane.
   j. RAB-Setup to First Packet Delay—This is a measure of the time between when the RAB is setup and when the first packet is delivered to the user.
   k. Average and Maximum TCP throughput for all TCP connections to HTTP, HTTPS ports during the browsing session of user—This is a measure of the throughput for all TCP connections during the time defined as the browsing session (see above).
   l. Non-idle time user throughput (NIUT) to the user for the plurality of TCP connections for HTTP, HTTPS protocols. The method of computing NIUT is described in a follow-on section.
   m. TCP failures for HTTP, HTTPS ports for the UE—This is a count of the number of TCP failures
   n. Repeated attempts to load the same page—This is a count of the number of times that the user attempts to load the same page.
   A plurality of the above parameters, as related to a user's sessions over an observation period or during a browsing session as identified above, is used to estimate per user QOE metric. The method of combining the parameters to derive the index could use weighted averages where the weights are determined from long term observation in an operator network, or by using decision tree methods. For example, the weights could be determined based on which parameters correlate with user abandonment rate. For example, on a new PS RAB, several TCP connections and HTTP requests were observed, and some objects were downloaded but client initiated connection close, or Abnormal RAB releases were observed. This is considered a user abandonment. A comparison of user abandonment ratio to each of these parameters can be used to determine the respective weighting of each parameter listed above. As user abandonment for web browsing increases, this indicates many users are not getting adequate service, and their HTTP Requests and TCP sessions are thrashing. When this is triggered, the Core Network, upon receipt of this information, could reduce load by moving some users to WIFI, or closing sessions of long sessions/persistent users, terminating HD sessions, or forcing user sessions (all TCP connections of a user) so that short duration users benefit.
4. Browsing session QOE per domain or site—The browsing session QOEs calculated in the previous section may be consolidated or rolled-up per domain to characterize QOEs of a number of users accessing the same page, or same site during an observation period.
5. Non-Idle time user throughput (NIUT)—The non-idle time user throughput is estimated as the throughput achieved by one or more TCP connections in an observation interval or during the duration of user activity, or during the duration of a user's PS session (for example, during an Active PS-RAB). This estimation excludes idle times, such as server think time, user think time, and TCP slow start impact, by discounting packets until slow-start threshold number of packets are received, idle periods based on outstanding segments to be ACKed, and idle periods due to user think times. User think times are estimated based on duration when there are no outstanding requests for protocols, such as HTTP. This method also removes idle periods incurred when the server paces while serving content for multimedia streaming protocols.

Prior-art methods such as TCP-Westwood uses TCP connection bandwidth estimation by a TCP-sender, based on interval between received ACKs, and using low-pass filter on the estimated short-time bandwidth to determine the congestion window (CWND) that the sender uses for sending the next TCP segment. Such methods tune the TCP sender as a congestion control method. The present disclosure estimates the per user bandwidth at much larger observation times (for example 1 sec, which may include several RTTs) and estimate the user throughput. This method, in effect, identifies the throughput that the underlying TCP methods are providing to user. Thus, the non-idle time user throughput identified herein is used to characterize application QOE when there is offered load and is not a per TCP connection congestion control mechanism. Prior-art methods, such as TCP-Westwood, are targeted to be deployed in end-system/TCP-sender whereas the present disclosure may be deployed in an intermediary, or proxy or end-system. As an intermediary when deployed in RAN, the methods described herein estimate a user's NIUT in the RAN.

Two alternative algorithms are identified for estimating NIUT. Both algorithms estimate NIUT based on outstanding segments and update NIUT as each ACK is received, and then compute Minimum/Average/Median/Maximum NIUT per observation interval. The first algorithm reports the Bytes ACKed per TCP connection for every ACK received for the TCP connection and the bytes received for all the connections are aggregated at 1 sec intervals to arrive at the NIUT for the user. The second algorithm reports bytes across all the outstanding TCP connections with pending segments whose timestamp is older than the timestamp of the segment for which an ACK is received. Each algorithm is described in detail below.

Algorithm 1

In this embodiment, the Non-Idle Time User Throughput (NIUT) is calculated on a per user basis by accumulating bytes transferred by each of its active TCP connections in the downlink and uplink per second. The RTND maintains a running average of this counter for each user to give the NIUT for every observation interval (1 minute to 5 minutes).

Following is a summary of how this is achieved:

1) On receipt of a TCP ACK on any of the ongoing TCP connections for a user, the number of acknowledged bytes will be recorded for that user.
2) The recorded acknowledged bytes (effective or actual) are summed on a per second basis across all connections for the user.
3) Whenever the RIND encounters an ACK that rolls the second over to the next, it obtains the summed up ACKed bytes (effective or actual), which gives the NIUT for that second.
4) Delayed ACKs would add up all the ACKed data in the second that receives the notification.
5) Duplicate ACKs will not add to this aggregate for the current second.
6) Retransmitted bytes will not be counted towards NIUT calculation.
7) A running average of all the second-intervals that have shown activity will be maintained for each reporting interval, thus giving the average NIUT for that particular reporting interval.
8) In case the object download time (ODT) exceeds one second, it would measure the average NIUT as: running average of curBytes, where curBytes is sum of 'nBytes' within a second, where 'nBytes' is the number of bytes ACKed
9) In case the object is downloaded within a second, it would measure the average NIUT as: (nBytes/(lastActivityTs−startTs)) where, nBytes=num bytes ACKed in that second (over all active connections).
lastActivityTs=time-stamp of last received ACK
startTs=time-stamp of first received ACK.

In other words, only the time between the first ACK of the interval and the last ACK of the interval is counted toward NIUT.

FIG. 7 shows an example sequence for a user with two overlapping TCP connections. The figure shows Non Idle Time User Throughput (NIUT) computation in each second based on timestamp of observed ACK from UE in the upstream, and the timestamps for corresponding downstream segments. This estimation is achieved as:

(a) On receiving the first ACK for any TCP connection for the user, the start activity time (Tstart) is set. Note: In some embodiments, Tstart is not set for first data segment, to reduce the code complexity as the impact would be limited to the first segment for objects with ODTs more than 1 sec only.

(b) On receiving subsequent ACKs,
  i) If the ACK is received within 1 sec from the Tstart, the number of bytes ACKed is added to the numBytes for the current interval. In the sample sequence FIG. 7,
    On A1, numBytes=1400, Tstart=0.6,
    On A2, numBytes=2800, Tstart=0.6
  ii) If the ACK is received after 1 sec from Tstart, the numBytes is added to the NIUT and the numBytes is reset to the last ACKd bytes. Tstart is updated to the current activity time.
    On A3, numBytes=1400, Tstart=1.7; NIUT=2800

(c) A $2^{nd}$ TCP connection is established at 1.8 since the first ACK.

(d) On receiving the ACK (A'1) for the $2^{nd}$ connection, the bytes acknowledged is added to the numBytes, along with additional segments ACKed for the first connection
    On A'1, numBytes=1400+1400=2800, Tstart=1.7
    On A4, numBytes=2800+1200=4000, Tstart=1.7

(e) ACK for the $2^{nd}$ TCP connection gets used to roll-up the bytes in the current bucket as the ACK is received 1 second after Tstart.
    On A'2, numBytes=1400, Tstart=2.8; NIUT=4000

(f) Any remaining bytes accounted are reported as NIUT when the last TCP connection for the user is terminated. On FIN', NIUT=(1400+1000)/(3.3−2.8)=4800

Note: Alternately, the implementation may use the last ACK time to exclude delays between the last segment ACK and the TCP termination message.

Algorithm 2 i) All packets for a UE for a specific Sector and specific QCI are typically maintained by a NB/eNB in the same queue. The NB/eNB is unaware of TCP, UDP connections and processes only GTP-U tunnel headers. User level protocol headers are not processed at the NB/eNB. Thus, this algorithm is based around the notion that that all packets for a UE on a specific downstream GTP-U tunnel are buffered by eNB in a queue irrespective of the specific TCP connection or UDP ports, and any packets sent before a TCP Segment for which ACK is received are also sent by eNB to the user device. For example, if an ACK for TCP-Connection X, was received corresponding to a user for a downstream GTP-Tunnel G1 at time Ta, and 2 TCP and 1 UDP Packets were observed to be sent at T1, T2, T3 (after Ta) on the same tunnel G1, and if an ACK for TCP packet sent at T3 is received at Te, all packets sent between T1, and T3 must have been transmitted by eNB.

ii) In RAN networks, such as UMTS/LTE and others, the NB/eNB maintains single queue for each QoS Class Identifier (QCI). There could be multiple priorities within the same QCI, which are indicated by IPTOS/DiffServ fields or by other methods. However most commonly, each QCI will be associated with a service class, and will have one priority. There could be multiple concurrent QCI flows for the same user. Most commonly one QCI, such as default QCI, will be dominant for a user. Thus, the algorithm will be described using single QCI class, and single priority. The algorithm could be easily extended to cover multiple priorities by a person knowledgeable in the subject area, for example, by applying these methods for each QCI or Priority class and/or by tracking the lowest priority class, and counting downstream segments of all priority classes for same user for the same sector to compute NIUT for the user.

iii) The UE receives packets, and the network layer within the UE returns ACKs. In some cases, the ACKs could be delayed to gain aggregation advantage (delayed ACKs). For example, many clients return ACK when 2 MSS segments are received. Depending on the application in UE, client TCP may return ACKs more rapidly for connection C1 and less actively for connection C2. However with single queue per UE per QCI, as outlined above, NB/eNB transmits packets in the order they are received by it.

iv) From (i-iii) above, it may be concluded that if ACK for Segment S1 received all packets sent out before S1 was sent-out to NB were sent-out within time-granularities much larger than TTI. The reason for dependency on time granularity is due to HARQ. The NB/eNB could maintain up to ~6 HARQ contexts. Thus, at sub-msec times, packet A1 is being transmitted by HARQ1, and could be in fast-retries whereas packet A2, that was received after A1, may be transmitted by HARQ2 flow and get an ACK sooner. However, if time granularities are an order of magnitude greater than TTI (1 msec to 10 msec), it can be assumed that packets transmitted in order or a packet dropped since HARQ could not complete, and would have to be recovered by TCP Retries.

v) Thus if a RTND maintains segment context (TCP-tuple, seg-seq#, packet-length, timestamp) for each packet sent to NB/eNB, and when any ACK is received, if the "seg-seq" in the ACK is matched with seg-seq# that was sent to NB/eNB, all downstream packets sent to NB/eNB before and including that seg-seq# could be considered transmitted for that time-interval.

vi) Thus as ACKs are received, each ACK will generate a throughput sample. By summing up throughput samples in a second and dividing by the number of samples gives average non-idle-time throughput (NIUT) for that UE across all connections.

vii) Note that the above TX segment context queue that maintains context of downstream packets sent to NB/eNB between the previous ACK and next ACK could contain both TCP and UDP packets. However, NIUT computation is based on TCP-ACKs—thus requires at least 1 TCP connection for the UE. Similarly, the algorithm could be extended to other protocols with response from receiver, for example, DNS, TFTP, HTTP/UDP etc., based on the application protocol knowledge. In these cases, the RIND tracks the timestamp at which the Request packet is sent, identifies when the response packet for that request is received, and counts all the downstream packet bytes sent from the Request packet to the associated response packet.

viii) It is important to note that this algorithm ignores idle times when there are no outstanding downstream segments for which ACKs are expected. During such idle times, the NIUT is counted as NA (Not applicable, indicating there is no demand by the user application). Thus if a user has 2 TCP connections, and the client and server use the connections actively for 2 Seconds, and connections are idle for 10 seconds, NIUT is computed for the 1st 2 seconds, and shows NIUT as "NA" during the 10 seconds idle time.

ix) Handling TCP Retries: One packet could get lost and depending on the algorithm, the sender could retry selected packets or all packets. The above algorithm would count both times (1st time when it is transmitted), and 2nd time it is retransmitted. This behavior is correct since RF resources are consumed again for retransmissions. However, this throughput is not effective user goodput, where goodput is referred to as user packets, not including retransmissions.

x) For computing user app level user goodput, there are 2 options:
  a) Count the packet when it is transmitted 1st time but don't count RETX. For this, for each tcp-connection, the device maintains expected ack-sequence number. Thus any segments with seq#<=expected sequence number should not be included in list of waiting segments.
  b) Count the packet when ACK received for a packet (explicitly or implicitly). For this, the devices needs to count throughput sample for each connection after ACK is received, and sum-up throughput samples in each interval, and divide by number of samples as in approach 1.

xi) Triple ACKs—Receiver (Client) may return triple ACKs for fast retransmit—In this case only 1st of triple ACKs should be counted.

xii) One could think of estimating non-idle time user throughput entirely based on ACK's received from UE through NB/eNB without keeping track of when the corresponding segments are sent downstream to the UE; for example, when ACK1 and ACK2 are received on a TCP connection at times T1 and T2, the difference between the Segment Sequence Numbers in ACK2 and ACK2 defines the amount of data sent by the sender between T1 and T2. However, TCP receivers may delay ACKs. In addition, the time difference between ACK1 and ACK2 is the difference in time when receiver processed the receive packets, and does not include time as to when the downstream packets were sent. The schemes presented above are based on RTT (Recv-ACK-time minus Segment Send time) and thus provide a more correct user throughput estimation (Number of Bytes sent/RTT). However, Segment Delta Count within 2ACKs (Delta-time-between-2ACKs) and counting bytes sent in that time is not the same. For example, if client side TCP sleeps for a while, wakes-up, and returns ACK after sometime, the bandwidth when it goes to sleep will be 0, and when it returns a burst of ACKs, the bandwidth will be huge. That huge bandwidth will not coincide with transmission of the corresponding segments. This could potentially happen frequently when Client Advertised receive windows are large.

In wireless mobile network, due to varying capacity and coverage, it is important to estimate the downlink and uplink throughput that a user device is getting not including idle times where there is no outstanding data queued to the RAN. The examples above show NIUT in the downlink direction, which is a measure of the throughput through the RAN when the TCP data segments are queued to the RAN (for example eNB or NodeB). The methods are equally applicable in the uplink direction. However, in the uplink direction, when an uplink TCP data segment is received from RAN by the RTND, RAN resources are already consumed. Thus, the above steps estimate NIUT that the user device is getting through the Core Network. The above methods could easily be extended to estimate uplink NIUT in the Radio Access Network, for example by counting bytes when TCP window in the uplink direction is open.

6. Multi-Media download & progressive download (such as YouTube Video, HTTP Live Streaming) QOE Metrics—Multimedia content that uses container formats such as FLV, 3GP, Mp4 etc., may be downloaded by a client application in a progressive manner where in the client player starts rendering the content before entire video object is downloaded. While sending such streams, a video server sends the content data over the TCP protocol, by sending the content as chunks with meta data header (such as FLV headers). US Patent Publication 2011/0167170 describes a transit network device monitoring the container metadata such as FLV, MP4, etc., storing the application data along with metadata, and sending out the content in a controlled fashion based on transit network and user conditions. The present disclosure identifies, by decoding the application meta data, (1) "KEEP AHEAD SECONDS", which indicates how many seconds play-time worth of data that need to be received by the client player, before it starts presentation to the user, and (2) the amount of data for each second of video. As content data are delivered to the user device and acknowledgements received, the RTND identifies the time between observing the client request for the video to the time when the ACK corresponding to the "KEEP AHEAD SECONDS" worth of data is received. This estimated time is termed "Video Start Time (VST)". As the remaining chunks of content data are received, RTND estimates the number of times that the keep-ahead buffer is empty which identifies the number of stalls. For example, if "KEEP AHEAD SECONDS" is 10 seconds, and as the first 10 seconds worth of data (as indicated by the FLV file) is 2 MB, and the ACKs that indicates 2 MB of data are received by the UE in 6 Seconds, the estimated VST will be 6 Seconds. Subsequently as content data delivery is observed in the downstream, it identifies the number of bytes corresponding to each second of video. As ACKs are received from client, it identifies if the time stamp for a segment is later than when the corresponding segment is needed by the player, and counts that as a video stall caused by slow delivery by the network. It counts such stalls during the presentation as, "Video Stutter Number (VSN)". The QOE metric for the video is computed from the VST, VSN and other monitored parameters as:

| Scenario | Description | QOE Estimate |
| --- | --- | --- |
| 1 | VST < 20 Sec, VSN = 0, ODT < total video presentation time, non-idle-time-throughput > video rate for HD for device-type | QOE = 5 |
| 2 | VST < 30 Sec, VSN < 1 per 5 Minutes, ODT < video presentation time, NIUT < HD rate, >MQ Rate | QOE = 4 |
| 3 | VST > 30 Sec, <60 sec, VSN < 1 per 5 Mins, ODT > 110% | QOE = 3 |
| 4 | Video presentation time, NIUT > MQ Rate VST > 60 secs, <120 Sec or VSN > 1, <2/5 Mins, NIUT > SQ rate, ODT > 150% video presentation time | QOE = 2 |
| 5 | VST > 120 Sec, or Bad PS drop in 1st 5 minutes ODT > 200% video presentation time | QOE = 1 |

Some multi-media delivery protocols, such as SilverLight, HTTP LiveStreaming (HLS), RTMP and others, switch streams to content with alternative resolutions based on estimating the TCP connection bandwidth while delivering the content. Such stream switching could be when the user starts accessing a new media-stream, or during the delivery of a long stream if multiple synchronized versions of the same stream are available in the delivery server (or proxy). The RTND monitors such delivery protocols, identifies the number of stream switches by decoding the protocol meta data such as FLV/MP4 etc., headers, or estimating the bandwidth changes during the stream delivery. For example, an average bit rate of 100 Kbps during 1 minute of YouTube video download changes to an average bit-rate of 768 Kbps in the next minute, the RTND identifies the stream switch to a higher resolution. The number of stream switches is an additional parameter in addition to the VST and VSN for estimating the QOE of multi-media streams.

7. MMS & Multimedia Upload QOE Metrics are estimated based on:
   a. Media object (100 KB) upload time (TCP or HTTP)
   b. Http Good vs. Bad Response codes
   c. Bytes Uploaded with abandonment threshold time of ~30 Seconds
   d. Number of Zero byte RABs
   e. PS Bad Drops, TCP, HTTP time-outs, Server Resets, Client FINs or Resets without receiving HTTP success code (200OK), after HTTP/TCP upload transaction is active.

Using this observed parameters, the QOE metric is estimated as: QOE=5 for user if all Requests in the observation period succeeded, QOE=1, if all requests terminated without successful completion. The intermediate values (2,3,4) are representative of the number of times the operation succeeded, or the percentage of operations that succeeded.

8. Multimedia session QOE metrics—The download and upload QOE metrics of a user per multi-media object as described in steps above may be rolled up into per user session QOE, by identifying the start and end times of a multi-media session of a user as follows. The start may be indicated by a request for multimedia by decoding application protocol headers (HTTP, RTMP, RTSP etc), or by associating the domain as a multimedia site (for example, YouTube, NetFlix, Hulu). Significant idle times may be excluded, similar to browsing session QOE.

9. Advertisement delivery QOE metrics—Certain sites and objects are characterized as ad delivery sites by configuration (for example, admob), or pattern matching within the HTTP URL string and identifying PHP strings etc. Delivery metrics are characterized by the object download times, and objects not completed, within the user's browsing session. The user browsing session may be identified as described above, or may be terminated based on the user migrating to another site, which is identified by new top level domain requests (HTTP URL Strings) from the user. This metric is a measure of failed ad object deliveries during user browsing or video sessions, in a target sector, group of sectors or site/domain.

10. Voice over LTE Quality of Metrics—This metric is computed as number from 1 to 5 based on:

| Scenario | Parameter | QOE |
|---|---|---|
| 1 | S1AP Bad drop, Repeated calls between same UEs in conjunction with short call duration, repeated failed origination attempts, repeated SIP registration attempts when SIP RAB is first established | QOE = 1 |
| 2 | SIP Connection lost, significantly long call setup time. | QOE = 2 |
| 3 | (2) + SIP not re-established with in Spec limit | QOE = 1 |
| 4 | Jitter > 90% quantile, drop > 90% quantile, XRTCP parameters (R Factor, MOS etc.) when available | QOE = 1 |
| 5 | P-P call, and loss of traffic in 1 direction for >spec-limit | QOE = 2 |
| 6 | Packet jitter < 60% quantile | QOE = 5 |
| 7 | Packet jitter < 70% | QOE = 4 |
| 8 | Packet jitter < 80% | QOE = 3 |

11. QOE metrics for Circuit Switched Calls—Unlike Voice QOE metrics such as Voice MOS scores, the QOE metrics identified in the present disclosure consolidate the user plane and control plane observations for the duration of the voice call. The MO/MT in the description below refers to Mobile Originated, and Mobile Terminated calls:
   a. Setup Failures with a cause code from UMTS/CP of 114 or other failures for MO and MT calls.
   b. Observed Signaling RTT for Messages sent to RNC and the corresponding Response falls in high percentile.
   c. The call durations are too short or Number of retries between the same users for MO or MT calls.
   d. The RAB or Signaling connection release codes observed in the Control plane correspond to abnormal release codes according the corresponding 3GPP specification for MO or MT calls.
   e. Call re-established between the same 2 user devices indicating the user disconnected and re-connected due to one way connectivity in the user plane.
   f. Round Trip Time for Type1-Paging messages sent to UE for Mobile Terminated Calls.
   g. Handing over user calls/signaling session to other Radio Access technologies, such as from 3G to 2G or 3G to 3G. This is identified by RTND by decoding the handover messages in the control Protocols (RANAP in UMTS, S1AP in LTE).

12. Paging RTT and Success Rate—Correlate Paging messages received from Network and correlate with response from user devices in a sector and estimate the Round Trip Time and Success Rate. Paging retries and success rates are calculated per TAI (Tracking Area Identifier) and eNB. Failed paging events are counted against last known TAI and eNB for the user. Paging success rate is also monitored against user and device type.

| Scenario | Parameter | QOE |
|---|---|---|
| 1 | Paging failure = 0 and Paging success = 0 in last interval | QOE = last |
| 2 | Paging failure > 0 and Paging success = 0 in last interval | QOE = 1 |
| 3 | Paging failure > 0 and Paging success > 0 in last interval | QOE = 2 |
| 4 | Paging failure = 0 and Paging success > 1 in last interval | QOE = 3 |

13. QOE for e-MAIL and VPN applications—Mail and VPN applications of all or premium users may be identified by specific TCP/UDP port numbers or by configured server IP addresses. The QOE of users while using such applications may be estimated from, (a) session drops with abnormal cause codes, (b) TCP retransmissions, (c) Non-Idle-Time User throughput during active sessions, (d) abnormal TCP session terminations. Plurality of these parameters in an observation interval are combined using decision tree (similar to web-browsing QOE) to identify QOE for that interval.

14. Per User consolidated QOE Metric: In an observation period, "T", which may be on the order 2 minutes to 15 minutes or more, a User may initiate multiple services, such as (a) SMS, (b) Voice Call, (c) video call, (d) web-browsing, (e) mail, (f) presence application (IM), or others. The per service (or application) QOE metrics of a user are combined to estimate user QOE or Happiness Index across all applications that a user activates during the period T using decision trees as outlined below. For example, if the QOE for every service that user initiated has QOE of 5, then the user is classified as Happy User (QOE=5). If all applications that the user initiated have a QOE=1, then User Happiness Index=1. The remaining levels (4,3,2) are based on frequency and type of the application. If any service (SMS, voice, video call, internet) has accessibility or retainability problem, the QOE for the UE is set as 1; where the accessibility, retainability problem is computed from the data imported from another network element such as OSS, RNC/eNB or estimated from the monitored Control and User Plane data and/or inference based methods as identified below. Alternatively, services are assigned priorities, (for example, sms, voice, priority 5, email priority 4, video-call priority 3, internet browsing priority 2, video viewing priority 1) and the user QOE is determined as the QOE of the highest priority service. The following table, and the corresponding QOE levels are examples to exemplify the consolidation of per user scores, and other variations of combining the scores to aggregates are possible in the frame-work of the present disclosure.

| | |
|---|---|
| SMS, CS QOE = 1, 2 | QOE = 1, 2 |
| SMS, CS, Browsing, Video, upload QOE = 5 | QOE = 5 |
| PS-QOE = 1, RAB attempts > 5 | QOE = 1 |
| SMS, CS QOE = 3, PS QOE > 3 | QOE = 4 |

It is important to note that the above illustrations are example methods of rolling-up of QOEs of multiple services the user uses in an observation interval to determine aggregate QOE for a UE in that interval. Alternative variations of consolidation are possible and is within the scope of the disclosure.

15. Rolling up of Consolidated Metrics to Sector, NodeB/ eNodeB, Group of Sectors etc.

User QOE metrics are aggregated per sector and group of sectors by counting the number of Users with a specific QOE value. For example, if there are 10 users within a sector, and 2 users have a QOE value of 5, 3 users with QOE=4, 2 users with QOE=3, 2 users with QOE=2, 1 user with QOE=1, the Sector QOE metric during that interval is defined as (2,3,2,2,1). Happiness index of sector may be estimated as the users above QOE=2 are considered Happy, and QOE score 2 and 1 are considered as unhappy users. Of course, other definitions of happy and unhappy users may be used. In this embodiment, the Happiness Metric is estimated as: 7 happy and 3 unhappy, and can be expressed as: (0.7, 10), i.e., with 10 users in sector, 7 users are Happy, and 3 users are unhappy (0.7 of the total are happy).

16. Rolling up QOE metrics for device classes

The QOE metrics of users or user application-types may be rolled per device class (for example iphone4, iphone5 etc.), from control and user planes as identified in US Patent Publication 2012/0184258, to estimate percent (or CDF) of QOE scores of users. For example, the rolled up QOE for device-type A, is expressed as, (0.1,0.2,0.4,0.2,0.1), where the first number indicates the fraction of users getting QOE=1, and last number indicates fraction of users with QOE=5. These metrics may be used to enhance services targeting to new device introduction, further decompose trends across subscribers or locations, and ensure SLA contracts for machine-to-machine (M2M) and device-to-device (D2D) applications. For example, different M2M devices may be used for a number of applications using different protocol transport such as (1) low-latency, low data volumes over UDP, or (2) high data uploads, periodically over a reliable transport such as TCP. Each set of devices would expect different QoE characteristics.

17. Rolling up QOE metrics for domains/web-sites

The user/user-app QOE metrics could be rolled up for domains or websites, by aggregating QOE metrics when the users access web-sites. The website information is identified after extracting user plane flows from tunneled protocols (such as GTP-U, GRE etc.), correlating the two unidirectional flows of a user as identified in U.S. Pat. No. 8,576,744 and US Patent Publication 2013/0021933, and estimating summarized percentiles for specific sites. Exporting per site metrics facilitates triggering site acceleration methods, initiating RAB QOS changes for additional monetization. The exported metric also facilitates application adaptation, as identified below. Aggregate Sector, Site (NodeB), Zone (sectors in a venue) also helps characterizing the coverage, thus reducing the need for drive tests.

18. Export of Consolidated QOE Metrics—The aggregate metrics are exported to other devices, Analytic platforms, network planning, and for monetization purposes. The following benefits are identified using the exported per user, per sector, and per zone, geographical area metrics:

a. Per Sector, Per Region, per Venue Score Card—the score card identifies goodness of coverage, and QOE as seen by the user using mobile services/applications in the specific area. Low metrics (high percent of unhappy users, along with total number of users) indicate problem areas and coverage holes that require network improvement. The venue/region score card also serves to compare multiple operator networks.
  b. Per Web-Site, per application type metrics provide monetization opportunities for operators. For example, if QOE for a large number of users while accessing a site is poor, the operator could suggest CDN relationships and/or caching and/or site acceleration improvements.
  c. Identify users that are consistently getting low QOE, the corresponding locations, estimate Churn possibility, and proactively suggest coverage improvement methods such as offering Micro/Femto Cell devices, and/or moving such users to alternative network depending on service. For example, a user may be moved to 2G network when CS voice call is initiated.
  d. Identifying low QOEs for a class of service, for example, for multi-media/instagram uploads by a specific device class compared to other device classes may indicate potential upload problems in the specific device class. This may be indicative of device class/network compatibility issues.
  e. Identifying significantly lower QOE for default/internet QCI9 when video calls with a higher priority or QCI facilitates network reconfiguration by operator. Such correlations between flows of multiple QCI classes may identify flow interactions through the access and core networks.
  f. Correlating sector/eNB user QOE level in neighboring sectors characterizes aggregate effect of interference between neighboring sectors, and facilitates evaluating alternative interference cancellation methods at an aggregate level. Additionally, this information can be used to evaluate alternative network tuning methods and optimizations, such as interference cancellation. The QOE metrics for a number of users can be used to characterize network tuning instead of or including parameters such as throughput, or signal strength.
  g. Reducing sector load—the metrics provided herein can be used to reduce overload sector loading. This can be done by moving users to alternative networks, such as WIFI, or by turning on small cells, such as femto- or pico-cells. Alternatively, loading can be improved by throttling traffic from the current users. For example, the transmission of high definition (HD) content may be reduced or eliminated. High bandwidth users can be limited by terminating one or more of their TCP connections.

The methods and procedures identified herein may be implemented in a new hardware platform and deployed in alternative locations as shown in FIGS. 1-6. In some of these cases, the RTND may have two interface modules, each of which is adapted to implement the hardware signaling required for the choice interface and the associated software protocol. This interface protocol may be IuB, IuPS or Gn, as shown in FIGS. 1-3. Each interface module is adapted to receive and transmit on the selected interface. Additionally, received data is placed into a storage element, typically a semiconductor storage element such as a RAM, DRAM or an equivalent technology. The movement of data from the interface module to the memory and vice versa may be accomplished using dedicated hardware, such as a DMA controller. Alternatively, a dedicated data movement processor may be used to handle the actual movement of data through the RTND. Once stored within the RTND, the information is processed in accordance with the RAN specifications. This may be done using dedicated control logic or a processing unit. The control logic/processing unit may have its own local storage element, which contains instructions to execute and local status. This storage element may be RAM or DRAM. In addition, at least a portion of this storage element may be non-volatile, such as ROM, FLASH ROM, hard disk, Solid State Disk, or the like. Using known specifications and protocols, the control logic/processing unit parses the received information to understand the packet at each protocol layer. In another embodiment, a dedicated hardware device having embedded instructions or state machines may be used to perform the functions described. Throughout this disclosure, the terms "control logic" and "processing unit" are used interchangeably to designate an entity adapted to perform the set of functions described. In other embodiments, such as FIG. 4-5, the RIND may have only a single interface module. In these embodiments, the RIND is able to listen to all communications on its interface, but cannot generate any communications on the interface.

Alternatively, they may be implemented in one or more software modules and incorporated in other network elements. The RIND contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

Alternatively, the control and user plane traffic from logical interfaces identified herein may be backhauled to an operator cloud data center, and the methods and procedures implemented on commodity hardware or virtual machines. Alternatively, both the plurality of QOE estimation methods may be incorporated in a transit application proxy/performance device, and the actions taken based on the consolidated QOE metric for plurality of flows to the user, all the flows in the sector/eNB etc.

Inference Based Estimation of Network-Access Congestion

A user device that intends to use packet service through a mobile wireless network such as LTE, UMTS, CDMA, etc., sets up a Packet Switch Radio Access Bearer (PS RAB) through Control Plane protocols, which requires setting up an RRC connection between the user device and the access network over the radio network (e.g. RF). Setting up an RRC connection, and establishing a PSRAB take different times depending on the control plane signaling load in the RAN, contention across common channels, and overall packet resource availability. RRC Connection establishment time and signaling load in RAN are not visible to network devices outside of NodeB, RNC, etc., that do not have visibility into RRC procedures. The present disclosure includes methods to estimate the RRC and control plane congestion, overload, and other abnormal causes, such as coverage. This may be done by observing behavior of user plane and/or control plane protocols such as DNS, TCP, application layer retries, number of CS and PS sessions, and RTT for control plane messages sent to the user device through RAN at the time of accessing the network.

The present disclosure includes the following methods as primary indicators to estimate network accessibility, or control plane issues associated with congestion, overload or coverage resulting in poor application behavior or ultimate failure:

1. DNS Retries—FIG. 9 illustrates a sequence for identifying DNS retries. When user activates an application such as internet browser, it generates a DNS request packet for the corresponding domain name, such as www.yahoo.com. In a wireless mobile user device (UMTS, LTE, CDMA etc.), when the user activates such an application, there may not be a packet session (PS RAB) established for the specific user. Thus, the DNS packet generated is queued to the network interface, and PS session establishment procedure is initiated through control plane. The PS session establishment procedure starts with the UE trying to establish RRC connection by sending RRC Connection Request on the Random Access Channel (RACH). Since the channel is a common channel subject to contention and collisions, the time to establish RRC connection is dependent on channel contention and common channel. Additionally, for setting PS Session (PS RAB), the UE, RNC, and SGSN exchange messages that involve several round trips through the RRC connection. Thus, as the load on the RAN signaling channels increases, the time to establish PS RAB increases. Meanwhile, protocols such as DNS, and applications, such as web browser that use such protocols, retry the operation and thereby queue additional DNS packets to the network layer in the user device. After the PS RAB is established, all of the DNS packets queued to the network interface in the user device are sent out as a packet burst with a very small delay between the packets. DNS uses UDP datagram transport and is subject to packet loss. Thus to accommodate packet loss and fast service, the protocol uses fast retransmissions (for example 4 retries) with small delay. These retransmissions by the protocol are usually OS dependent, based on the DNS client application. For example, the resolver may start by sending out request on primary network interface, primary DNS server IP address, on a specific UDP source port. After some time, the resolver may initiate requests in a progressive manner by trying alternate interfaces, such as alternate DNS server resolvers using other DNS source ports. This is usually configurable in each operating system but these are rarely changed, which allows assumptions to be made on how long RRC connection may take to establish. After the retry attempts are completed and DNS Response is not received, DNS protocol layer returns an error to the application, such as a web browser, in the user device. The application (browser) may initiate further retries or may result in a failure. As the time to establish PS RAB increases, the number of DNS Requests to resolve the same domain with different UDP Source Ports and different DNS-REQIDs with small interval (less than 1 second) between such request increase. When congestion in the access network is not high, such DNS bursts are small (2 to 3) which corresponds to 2 or 3 seconds establishment time. As the PS RAB establishment time increases, the number DNS Bursts after a new PS RAB setup increases to 6 to 8. The present disclosure accommodates the scenario where the RTND does not have visibility to the RRC procedures between the User device and the NodeB/eNB etc. and estimates RRC congestion based on the DNS bursts that occur during startup of a new PS RAB. Furthermore, the present disclosure utilizes the amount of time taken for RRC procedures based by identifying the underlying operating system and operating system version. Ultimately, such delays or failures have an impact which may be visible to the user ranging from sluggish application start to failures in the application. FIG. 10 illustrates a correlation between DNS retries and RRC accessibility measurements of underlying RNC.

2. TCP SYN Retries—FIG. 11 illustrates a sequence for identifying TCP SYN retries. TCP SYN retry bursts are similar to DNS retry bursts above. This situation arises when the domain name that the user device is trying to connect to is already cached and the IP Address of server that the user device is trying to connect to is known to the UE. This scenario also arises if the user application that is initiating PS Session setup uses a previously known IP address of server (for example a VPN server, or from DNS cache). Similar to the DNS server scenario described above, when an application that uses TCP attempts to setup a TCP connection to TCP server, it sends TCP_SYN. If there is no PS RAB when the application generates TCP_SYN, the TCP_SYN packet is queued to the network interface, and PS RAB setup starts. TCP protocol retries the operation with small intervals, and notifies an error to the application. The application may then retry the operation with a different TCP_SRC Port numbers. Thus, such TCP_SYN bursts increase when PS RAB setup takes longer due to RRC congestion. Thus the present disclosure uses the large burst of TCP_SYNs where the delay between the TCP_SYN packets to the same destination is small, as estimate of RRC congestion. FIG. 12 illustrates a correlation between TCP_SYN retries and RRC accessibility measurements of underlying RNC.

3. Application-level Retries—Application level retries in rapid succession to establish a new connection is an indicator of underlying network issues. This occurs when the underlying networking protocols respond with a failure and the application chooses to control the error handling outside of the operating system. In this case, similar requests would be triggered to a common server IP address, or set of server IP addresses but with different source TCP or UDP port numbers. In this case, it is possible for one or more of the 4-tuple, made up of source IP, destination IP, source port, destination port, to vary as part of the error handling and retries.

4. Paging Delays and Failures—Network initiated connectivity to a user device is required when either downstream traffic is destined towards a user or other services such as mobile terminating call or incoming text message. The paging request starts off with a notification on the paging channel which is broadcast as part of system information in the last known area of the UE. When a user device is in RRC idle, it is required to periodically check the paging channel for incoming network activity. The intent of coordinating paging on a predefined interval is to allow the user device to preserve battery and coordinate network activity. Multiple situations can occur during paging:
   a. Delay of user device creating a PS RAB following a paging request in the paging area (routing area/tracking area) is associated with coverage issues, contention issues or congestion. This results in a sluggish response allowing the network to fulfill the service request.
   b. Failure to respond to paging results in more paging activity as the network broadcasts over wider ranges to find the user. This negative effect causes issues with degraded services, increases signaling load with paging, and ultimately results in more activity. This ultimately results in determining that the user device is either powered off or there is a coverage issue between the user device and network.

5. Upstream TCP traffic bursts—Upstream traffic from user devices is a growing trend as a result of creating and sharing content primarily driven by images and videos shared over MMS, OTT communication and social networking. This traffic is primarily over TCP connections as the applications take advantage of reliable transport and simple HTTP interfaces. Under such circumstances, TCP connections may exist longer than RAB sessions which can timeout in as little as 5 seconds. In these circumstances, TCP traffic originating from the user device for an existing flow may exhibit traffic bursting when PS-RAB/RRC access is delayed in the following ways:
   a. Fills congestion window size
   b. Transmits with reduces inter-packet gap The present disclosure defines a set of secondary indicators to further classify the network accessibility or control plane issue. The intent is to use a combination of primary and secondary indicators to isolate behaviors through inferences as follows:
1. RAB Accessibility—Radio Access Bearer (RAB) cause code values returned for accessibility may be used to further classify problems found with primary indicators. The following are examples:
   a. A successful RAB establishment may suggest that there were no control plane issues in the network elements and contention was limited to RRC connection setup. This could be categorized as RRC contention.
   b. A RAB response with explicit failure suggesting not enough radio resources defines that the access network element (e.g. NodeB, RNC, eNodeB) did not have enough resources for Radio Bearer setup between the UE and NodeB, but RRC connection was established enough to attempt to negotiate the resources. This could be categorized as NodeB or sector congestion.
   c. A RAB response indicating underlying network activity. For example, circuit switch fallback may be required to allow voice services to the user device, and hand-over or hand-down may be due to mobility reasons. This could be categorized as network induced delay by other procedures.
2. PS and CS session counts—PS and CS session counts associated with particular sectors, cells or carriers may be used to indicate reaching points of congestion. For example, reaching the limit of number of circuit switch voice calls that are possible for a given sector may result in the inability to establish requested PS RABs.
3. Control Plane RTT—The Round trip time for control plane messages that directly or indirectly communicate with user device through RAN and receiving responses are an indication of the RRC and Control plane signaling load. During overload or congested periods, the timing between request and response may grow. For example, attempting to establish a PS RAB may result in an accessibility failure.
4. Device-based Error Handling—Different devices and, more specifically, different operating systems on different devices handle DNS retries and TCP SYN retries in slightly different manners.
   a. DNS client timeout retries are programmable on Windows operating systems and defaulted to a particular backoff in seconds after each failure (e.g. 1, 1, 2, 4, 4). In comparison, the DNS client on Linux operating system has simple 5 second timeout with one retry.
   b. Similar to DNS client timeout retries, TCP SYN timeout retries on Linux operating system retries occur after 3, 6, 12, 24 seconds. In comparison, Chrome browser starts with 1 second timeout.

Considering the device and operating system can further refine the identification of network accessibility issues at the RRC with actual amount of time user device was blocked.

5. Network/Sector Reselection—Distinguishing capacity and coverage issues may be further resolved by associating with Public Land Mobile Network (PLMN) reselection, Radio Access Technology (RAT) reselection, or sector reselection. For example, a user device will attempt to attach to home network, best RAT, and best quality signal as the highest priority. If user device cannot access first priority 4G network, it will try other access networks that are suitable, followed by networks that are allowable. This process results in a series of events including registering with the new network via an MME attach, ping-ponging between sectors, and active 5-tuple flows straddling access technologies.
6. Summarization—Consolidating views of primary and secondary indicators around locations (sectors, regions of sectors), user device types, user device operating systems, and network devices (e.g. NodeBs, etc) may be used to expose trends of behavior that may uncover broader issues. For example, it may be realized that a particular operating system may not respond to paging events when in RRC connected state after operating system version X. Another example may involve identifying an area in the network that routinely has congestion issues during weekday commuting times
7. Correlation—pulling in performance measurements and KPI logs for other network devices (e.g. (e)NodeB, RNC, SGSN, OSS, MME, PCRF, HSS, etc) in the network may also be performed to provide further details. For example, combining particular RRC contention for particular location in the network may expose a faulty system information parameter setting for sector selection process where the sector is barred from use during certain time of day.

The present disclosure envisions bringing combinations of primary and secondary indicators together in a decision tree manner to identify reasons for network accessibility issues such as congestion, coverage, and overload. For example, a table may be created providing the following inferences:

| Primary Indicator | Secondary Indicator | Network Accessibility Interference |
| --- | --- | --- |
| DNS retries not found | RAB connection successful | No network accessibility issue |
| DNS retries found | RAB connection successful | RRC congestion |
| DNS retries found with count equal = 3 | RAB connection successful And Device OS equals A.v1 | RRC congestion, across 4 seconds |
| DNS retries found | RAB CS fallback | Network access technology due to voice request |
| TCP SYN retries found | MME Attach | Network initial access |
| TCP SYN retries found | Aggregate found in same sector | Sector wide congestion |
| Paging failure on access network 1 | Network reselection on a access network 2 | Network coverage |

Other inferences may also be made based on primary and secondary indicators.

It is envisioned that the methods identified herein are incorporated into a RIND intercepting control plane and user plane protocols as shown in FIGS. 1-6. Some of the methods and procedures are applicable to other network devices outside of the mobile network such as control plane servers (e.g. PCRF, Application Servers, MME, etc), packet core devices (e.g. PGW, SGW, GGSN, SGSN, transport network routers/switches, etc), network intermediaries (e.g. caches, WAN optimization platforms, Deep Packet Inspection devices, etc) and origin servers (e.g. HTTP web servers, video delivery systems, mail systems), where only portion of the information, such as only User Plane data is available, or only control plane information is available.

Some of the methods and procedures described herein are applicable to other network access technologies that have a decoupling between application and transport protocols and underlying link layer behavior. These would include technologies that support arbitration cycles such as collision detection (e.g. Ethernet), or collision avoidance (e.g. IEEE 802.11) resulting in varying delays in network access.

Network Access & Control Plane congestion are estimated and summarized as follows:

(1) RTND identifies burst of DNS Requests with a timer interval between requests less than configurable time in the order of 10's of milliseconds, the query string that identifies the name to be resolved is identical between the packets, the REQID and/or Source Port Number in the DNS Request packets are different. It counts such DNS Requests as DNS-Repeats.

(2) Similar to Step 1 above, RIND identifies TCP Connection establishment requests (TCP_SYN Requests); i.e., TCP_SYNs for the same IP destination, same TCP source port number, and there are no prior tcp connections established on this PS RAB (i.e., the TCP_SYN packets are on a new RAB, and a RAB is no longer new after at least one TCP connection is established or any other traffic is going through this RAB). It counts the number of TCP_SYNs on a new RAB.

(3) Similar to Step 1 above, RIND identifies application-specific retries; Restart TCP connection on any combination of different source port, different destination port, different source IP, different destination IP. Changing the source port is a straight-forward connection retry, trying different source IP addresses (or network interfaces) may also be a technique for error handling. Some applications may also support alternate destination port lists, and destination IP addresses to connect to alternate servers (e.g. 80, 8080).

(4) RTND counts the number of CS and PS sessions in the observation interval.

(5) RTND computes the Round Trip time for signaling messages such as RAB Setup that are sent from the Core Network to the RNC and the corresponding Response message received from RNC. The time difference between RAB Setup Request and Response is computed as RAN-RTT.

(6) RTND counts the number of RAB setup failures. The setup failures are counted by RAB Setup Response messages with failure cause codes or Setup messages for which Setup Request message is sent and response message is not received.

(7) RTND computes the Paging Message-RTT as the time between sending a Paging Message from Core Network to RAN and receiving a signaling connection setup message (for example RANAP Initial UE message in UTRAN)

(8) RTND counts certain signaling failure cause codes, that indicates there is resource congestion in RAN (for example RANAP cause code=114 in UMTS network)

(9) RTND counts reselection of PLMN, RAT, and sectors by tracking attachments in the network, explicit handover scenarios including hand-up and hand-down, and user device mobility occurrences as recognized after periods of RRC idle state, or powered off

(10) The values observed in multiple sectors over multiple days are analyzed to determine normal and maximal values. The historical values are analyzed with statistical methods to determine thresholds. The thresholds are used to determine congestion buckets. For example when the DNS Repeat Bursts or TCP_SYN bursts for 20% of user sessions when the number of active PS sessions is >30 is characterized as severe congestion (congestion level=5). The congestion metric is estimated as value between 1 to 5 where 1 indicates not congested and 5 indicates severely congested.

(11) Import performance metric data from other network devices such as RNC, NodeB, OSS to correlate between the estimated metric, and imported KPIs. Alternatively, use the plurality of KPIs imported from operator network devices to estimate access network congestion.

The estimated network accessibility metrics and summarizations are exported to other network elements in the operator network such as OSS, PCRF, RNC to trigger further actions such as admission control, RAN network selection, moving current or new user sessions to alternate sectors or carriers, flag for further review, etc. The external device that receives the network accessibility metric could initiate RAN configuration changes, such as SIB broadcast messages for specific base stations to move new users to alternate sectors.

Additionally RTND includes the access-network congestion metric, in estimating user QOE for any services.

Application Enhancements for Delay and Capacity Varying Networks

Controlling the object downloading and uploading behavior of client applications, such as web browsers or transit caches, is an additional aspect of the present disclosure. The disclosure defines methods by which a web-server or web-cache, or a transit network device could specify whether a new html page requested by the client or transit device should be used from internal caches or not fetched at all, or fetched if the transit networks conditions are favorable, or substituted with other objects previously cached depending on the client's access conditions to the server or the transit network. The disclosure describes enhancements to HTTP methods for selecting alternative resolutions for large object uploads, and continuously interrupted transfers due to network coverage, network congestion and server overloads.

Downlink (Network to User) Delivery Enhancements

In the prior art methods, a Web-Server that serves web pages (html pages), and objects referenced by that page with URLs uses HTTP Response headers that define caching, timer expiration etc., to indicate how the transit device caches or the client should treat such objects. For example, these headers indicate whether the object can be stored in client cache or transit caches for future pages that may reference such objects. HTTP standards also specify Request headers with conditional control, such as if-modified-since indicating that the server should return a new object only if it has a newer version of the referred object. Some servers return object responses with object headers with MAX-AGE=0, forcing the client to always send a request for the object and then return http response with Response Code=304 indicating the object has not been modified, which causes the client (or transit cache) to use previously stored content in cache. Thus, with the "Response Code=304" semantics, while the transit network bandwidth is not wasted by the server re-sending the object, it still consumes a Request-Response round trip through the transit network and thus increases the page down load delay. The Request-Response delays are particularly important in wireless mobile networks, where the response times increase significantly depending on the coverage, the mobility of the user device, or transit network congestion. The round trip times are also important in wire-line networks when the transit network or server approach congestion and overload. While the server uses the response headers to control whether it should be re-validated before it is used in future, such determination does not consider future response times between User Device and Server or Transit Cache. For example if a web-server home page has 40 objects, and the server sent all of them with Max-Age=0, and marked them as cacheable, client device fetches the objects and stores them in local cache. If the user fetches the home page again, the client re-issues all the requests for associated objects. If the objects are not changed, the server returns 304 Response (object not modified) for each object. However, this operation would use 40 round trips. If the mobile user moved to a low coverage area that has significant increased round-trip time, completing page load takes considerable time. Client applications, such as browsers, use limited number of TCP connections to a specific server and/or multiple servers to minimize network and server contention. When a web page requires a larger number of requests than the maximum number of tcp-connections, it queues the remaining objects behind one or more requests using HTTP pipelining (if the request is for the same server), or delays request until one of the previous requests is complete. This in-turn increases page download time, thus decreasing quality of experience by the user. Some of these requests could be for advertisement objects, and increased delay for such objects, for example, due to server side processing of determining the appropriate object for the user, may cause missed advertising opportunities.

The present disclosure recognizes that http protocol and web methods in the prior-art are designed with the content publisher's (website) view of how the pages/objects should be presented to user under stable user-access and network environments. These methods do not adequately address the highly varying network conditions in a RAN network, due to coverage issues, delay, packet drops, and congestion to tune the web-pages. Multi-media applications, such as video delivery applications, use application specific methods such as trans-coding, trans-rating, alternative content selection, adaptive bit-rate streaming etc., specific to such applications. The present disclosure describes extensions to applicable protocols for general web objects/services for content selection, network offload, use of cached content either from client cache or transit caches based on client, transit network, and CDN or server load.

The present disclosure identifies new tags by which the server (or transit cache) controls the handling of objects that may have been stored in the client cache or transit cache. The server specifies the new tags outlined herein with corresponding object reference in the web page. The server could specify the tags within the page depending on the network conditions that it is aware of at the time of sending the new page, or may use other parameters such as location, user's device type etc. Thus, the server could construct the tags for each object reference in the page that it is sending to improve the QOE of the users, thereby reducing network usage during unfavorable conditions. Alternatively, the server specifies the new-identified tags with response time deadlines; for example, "use object from client cache if object not loaded in 10 msec". Such a method facilitates alternative previously cached objects, instead of partially blank containers when the object download time increases due to diverse network/server conditions. Additionally, it provides a mechanism for network operator to deliver operator monetized advertisements when the network conditions for delivering such objects from the content publisher or CDN are not favorable.

Proposed Header Extensions:

(1) A new tag, "if-not-received=delay-time, alternative URI" is identified. This tag specifies that if the client requested object is not received within the specified delay time, the client should use the alternate URI from its cache. Alternatively, a transit network device uses this tag to deliver object from its cache, instead of waiting for the object from the origin server or CDN device. For example, assume that the html/xml object that corresponds to the top level page contains links to other objects. Using the new tag, the web server specifies that, when the browser or transit proxy sends the request, and does not complete downloading object within a delay-time, such as 20 msec, it should use alternate object previously stored in its cache. This facilitates faster completion of page rendering to user.

(2) A new tag, "if-delay-greater-than=delay-time, alternative URI" is identified, which specifies that if the delay to the origin server in the recent network access (such as previous object download or TCP connection-setup), the client should use alternate URI specified. A transit network device could use this tag when the delay to the core network or origin server or preferred CDN is increased. This tag reduces congestion by the client or transit proxy not sending the http request if the network conditions are not favorable, where this determination may be based TCP connection setup time, or throughput achieved for previous objects. For example, a web-server constructs a top level page with embedded links to other objects, such as images, advertisement objects etc. These links may be dynamic, such that the web-server wishes to present the newer objects if the network conditions are favorable. The new tag facilitates the web-server using an older previously cached object if the client (or transit proxy) determines that recent bandwidth/response time to the server is too slow or transit network is congested. Thus, the web-server could direct the client to present a previously loaded "Ford Car" advertisement rather than sending the http request for the new object. This reduces page completion time and reduces congestion since the request was not sent by the client.

(3) A new tag, "if-bw-less-than=bw, alternate URI" is identified which specifies that if the bandwidth achieved by the device in the recent network accesses by the user device is less than specified bandwidth value, the client should use the alternative URI. The alternate URI may refer to the same server/content publisher with lower-resolution of the same object, or an alternative server/CDN. A transit network device such as RTND, or a caching device in network operator may use a traffic offload interface. For example, a web-server could construct the top page with embedded links that refers to an image with resolution=720P, and size=1 MB. By using this tag, web server could direct the client to fetch a lower resolution version of the image if the browser observed network bandwidth is below 50 Kbps.

(4) A new tag, "network-quality-metric=(delay, bw)", that indicates the response delay, and bandwidth that client observed recently prior to the current request. The values, (0,0) indicates the parameters are unknown to the client. This facilitates a CDN or transit cache, or PEP, or origin server to adapt the web-page, one or more objects, or determine and initiate moving to a different access network, operator network etc., based on partnerships. For example, a web-site, such as CNN, will have dense pages with many embedded videos, high resolution images etc., and could be viewed by a user if the delay, bw to the server are 100 msec, 1 Mbps. Due to the transit network congestion or RAN coverage area for a mobile user, user device determines delay=200 msec, bw=100 Kbps. When the client exports the above parameters, it facilitates the webserver to construct the page using lower resolution images. Alternatively, if the user is a priority user, and the site has a relationship with other operators (for example a WIFI operator), the site could initiate switching the user to a specific WIFI network.

(5) A new tag, "if-later-than=time", by which the server indicates to the client (or transit cache), that if the last-modified time of the object in its cache is later than the time specified with this tag, it should use the object from the cache and not re-send the request for validating the expiration time of the object. Since the server would not know when an object that it previously sent to the client will change, this tag facilitates allowing the server to let the client use a previously sent object with last modified value. Unlike the "if-modified-since" conditional methods in prior-art, the client does not need to re-issue the request for validating the object expiration. It is envisioned that this tag will be specified by the server in the html/xml etc., object that contains the object link, and the conditions specified by the tag is evaluated by the client before sending the request.

Uplink (User to Network) Delivery Enhancement Methods

Enhancement methods while uploading large objects, such as multi media clips using protocols such as http during network congestion periods and in networks with higher error rates such as in mobile wireless networks is yet another aspect of the current invention. The methods disclosed in this section propose extensions to protocols such as TCP, HTTP etc., to advertise intent of large object upload to the network; to continue long object upload in multiple parts if network connectivity is interrupted due to user mobility, device power, transit network or server congestion; and to select alternative resolutions for reduced object sizes and network usage. Such resolution selection may be initiated by the client, server, or transit network device based on network conditions and user coverage.

HTTP protocol includes efficient methods such as byte ranges, retry-after etc. for large object downloads. For example, while downloading a large object from a web server, if the transit network fails during transfer, or server is severely congested, or client runs out of battery while downloading a large file, client applications that use HTTP transport could recognize network outage during object download, save the partial object, and reconnect to server at a convenient time and re-fetch the remaining portion of the object using HTTP byte ranges. This is possible since the server maintains the complete object, and it could initiate transfer from any portion of the object as requested by the client. Since the client is the user of the object, it could monitor the progress of the transfer and continue from point of interruption. Several software upgrade applications that download large objects from server use such methods. For uploading objects, HTTP protocol also defines POST method by which client sends the object along with the HTTP Request headers. While POST is convenient for uploading small objects, it is inadequate for large uploads. Several applications, such MMS applications (OMA/MMS), use POST methods to upload multimedia objects from a mobile device to a server. For example, to upload a large 10 MB video clip, the client starts sending a POST Request that includes HTTP Request Header along with the object data. If the transfer is interrupted due to network outage or by server or by client, the client has to retry the entire operation. When user retries the operation, it restarts the entire object upload including the portions that were sent before. The client could not use the "byte range methods" described above that were used for downloading an object. The reasons are:

(1) when the transfer is interrupted, the client does not know what portion of the object has been received and saved as partial-object by the server, (2) the server does not know if and when the client will continue the operation, and whether it should save the partial object, and (3) when the client re-initiates the upload, the server does not know how to merge the previously saved partial object with the remainder of the object.

The present disclosure defines extensions to facilitate such multi-part transfer.

The HTTP Specification includes content length that defines the total object length, and range specification by which client could send a large object with multiple http requests (range request). However the client needs to segment the large object to smaller segments before using the byte-range methods. If the communication is interrupted during a large object transfer, the HTTP methods are inadequate to resume the operation from the point of interruption.

Another problem arises during initiation of an upload of a large multi-media object, such as a picture, or multi-media clip. When the user initiates an upload, the application queries the user whether it should use High, Medium or Low resolution, and also displays the corresponding upload file sizes. When high resolution content is available (for example on a mobile phone), users generally want to upload highest resolution. However, when such High-Resolution object transfer is initiated, the achievable network bandwidth to server may be very small, thus causing transfer to take very long. This duration may be beyond the user's waiting tolerance level, thus causing the user to cancel the operation after transferring a portion of object, thereby consuming a lot of network resources in a congested network, or significant resources in the server. Furthermore, the user service plan or server resources (for example storage on server) may not be adequate to support such large transfer at that instant. If the network and server conditions are known to the user, the user may select lower resolution or the server may direct the user to select lower resolution. The present disclosure proposes extensions to HTTP 1.1 to suggest lower resolutions to the user when network is congested, and or delayed delivery mechanism by which the start of upload is deferred until uplink network conditions and the battery power of the mobile device are more favorable.

The present disclosure identifies methods and procedures to improve large object uploads from user device to network servers using application protocols such as HTTP in wireless and wireline networks. The methods may be broadly classified as:

1. Mechanisms for improving mobile content upload efficiency and accuracy
2. Mechanisms for resuming from a previous incomplete upload
3. Protocol extensions for client to indicate intended upload to server and transit network elements These methods are described in more detail below.

Mechanisms for Improving Mobile Content Upload Efficiency and Accuracy

There are several mechanisms which may be used to improve mobile content upload efficiency:

1. Byte-range requests over multiple TCP connections using range header specifying "start-end/total"
2. Content format selection based on network and server conditions
3. Load Pacing by the server Each of these mechanisms is described in more detail below.

The present disclosure describes a scenario wherein while initiating upload of a large object, the client should split the object as multiple objects, and use HTTP byte ranges to complete the upload with several HTTP Requests. Each of these requests contains a byte-range (start-end offset), which is part of the current POST Request. Since the server does not know the size of the total object that the client is intending to send in multiple POST requests, the client may specify total-object-size. Thus, the server, upon receiving the individual byte-range object, could group them and when total-content-size bytes have been received, will know that the client has completed sending the entire object. The server could then complete further operations on the object, such as closing the file, or updating posting the object link to a server page. The server should return HTTP-Response code=206 (Partially complete) for each of the post Requests, until all the portions corresponding to total-size are received. When the total size is received, the server should return the Response-Code=200 (OK), indicating upload transaction is complete. If the transfer is interrupted before the upload is complete, the client could continue from the previously received 206 response or from the segments sent and ACK received. In this scenario, the server continues from the previous point of interruption. If there are any missing segments, it should return error indicating missing segment.

In another embodiment, content format selection based on network and server conditions may be performed. Content upload applications, such as MMS Upload, and photo-upload, when activated for uploading an object, query the user to select High, Medium or Small resolution. The applications also typically present the object sizes to the user. However, the user is unaware of expected upload times for the corresponding objects under the current network conditions and server load. Typically, users select maximum resolution content. If the network/server conditions are unfavorable during the upload of this larger object, the transfer may be interrupted by the network (lost connectivity), by the server (TCP timeout or server timeout, or http request timeout), or by client (upload is taking longer than user tolerance, or battery in user device dies). It should be noted that the user device and the transit network may be aware of the user's bandwidth to the network, and may also be aware of how many other users are competing in the sector. Based on this, the client could estimate the upload time. Furthermore, after receiving POST request header that contains content length, the server could estimate upload-time for the object and whether such long transfer is optimal for the network and user's service plan at that time. Thus, upload object selection can be done by the client based on the bandwidth estimation provided by one of the following entities:

1. By the client: Based on the user's session throughput measured by the client during prior network access.
2. By the server: The server measures the session throughput to client during the initial portion of the transfer (for example during first few packets of POST Request), and returns Http Response=100-Continue and an extension header indicating the client should switch to a lower resolution. In this embodiment, the client should wait for 100-Continue response from server before starting to send the large object.
3. By the network: Network quality is obtained by client by querying the RAN or Server.

The estimated bandwidth by the client or server or transit proxy to estimate the time for new upload may cause the server to switch to alternate resolutions to reduce upload times or reduced bitrates that could be better supported by the transit network. Such a selection could be made via interaction with the client by presenting estimated time for each of the resolutions/object sizes.

In another embodiment, the server may help alleviate congestion by pacing the content. For example, when the load at the server receiving uploads increases (for example at the MMS server), the server may return HTTP Response Code (503-Service unavailable or 3XX-Redirection) with "Retry After" Header, indicating that the server is currently congested and the client should retry the operation after the specified time. While the current HTTP Specification (RFC 2616) specifies a "Retry-After" mechanism, the present disclosure uses the "HTTP Retry-After mechanism" to schedule clients. This is achieved by the server maintaining a reservation list of future transactions with progressive times for the new requests, thus spreading the load.

As an alternative to using "Retry After" semantics, the server may use ACKs selectively to limit the number of simultaneous Uploads getting high bandwidth. For example, if 20 Clients initiated uploads and the server decides it could optimally support 15 uploads, it services the first 15 clients at faster rate, to achieve higher upload bandwidth, and services the remaining 5 clients at a much lower rate. The slow servicing maintains TCP connectivity. This mechanism should be contrasted to the normal TCP behavior where, as the number of tcp connections increase through a shared medium, each TCP connection tends to get a roughly equal bandwidth proportion (available bandwidth/number of TCP connections), thus slowing down every TCP connection. HTTP/MMS servers maintain a timeouts that defines how long a HTTP Request could take in seconds. For example, if the server uses a timeout of 200 seconds, and POST Request by which a client uploads a 4 MB object takes 250 seconds, after 200 seconds, server declares a Request Timeout and returns an error response. Limiting the uplink users also reduces uplink contention and uplink interference and also allows to use higher Transport Block Sizes, thus improving efficiency.

In addition to pacing clients when the server is congested, another embodiment is also possible. In mobile networks, clients use HTTP header extensions to include Radio Sector ID, CQI, and Signal to Noise Ratio that the mobile device is seeing when it is initiating the upload operation. The server could then use the sector-ids to determine how many simultaneous upload operations are active in a sector and limit the number of simultaneous sessions that initiate high bandwidth requests in a sector, while deferring new requests beyond configured or estimated limits by using the "Retry After", or selective techniques described above. Identifying simultaneous large object uploads in a sector and enforcing a limit is important in mobile networks, since when a number of users initiate uploads simultaneously in a sector, the server IO load and uplink interference increases, thus decreasing signal to noise ratio at the receiver. This decreases the aggregate uplink throughput for all the users, thus causing session interruption due to the reasons described earlier.

Mechanisms for Resuming from a Previous Incomplete Upload

As described above, an improved method for resuming a previous incomplete upload is also disclosed. There are a number of different embodiments, which are described below.

In one embodiment, when the client initiates a large object upload, it should use an extension header, (called, "Save-Partial" in the present disclosure) in the HTTP Post method, indicating to the server that the server should save the partial object, and that the client plans to re-connect and continue from point of interruption. When the extension header is specified, if the entire object, as specified by the POST Request content length, is not received by server, the server should save the portion of object that it received along with starting and ending offsets. If the transfer did not complete and a response of 200 (OK) is not received from server, client should send a HTTP HEAD request for the same object previously sent to server to determine how far the previous transfer progressed and what portion of the partial object was saved in server. The server should return the size of the object, plus a new flag indicating it is a partial object that it received from client and that it was an interrupted transfer. The client could then issue the POST request using byte ranges and initiate upload of the remaining portion of the object.

Alternatively, for determining the number of bytes successfully received by the server, the client may query the local TCP stack to determine the last segment that is ACK'd by the receiver. This requires that the server store the portion of object that was received and ACK'd, anticipating the subsequent retry by the client with byte range specified in the POST Request.

When server receives a POST Request specifying a long object and the "Save-Partial" extension header described above, if the transfer is interrupted due to network conditions, or client closing the application, or timeout, server should save the partial object in temporary storage, identifying the client and object information. The server should keep the partial object, expecting the client to retry the operation. The duration of time that the server should retain is a policy decision in a server, based on the amount of storage and other resources in server. The option of saving partial object may be specified by HTTP Request header extension by which client specifies that if transfer is interrupted, the server should save the partial object, and the client intends to continue the operation in a subsequent request.

As an alternative to the method above, after a POST request fails before completion due to user action, (for example user closing application or cancelling POST upload, or server timeout, or HTTP Request timeout with Response code=408), the client retries the operation by sending the POST request along with object. The server, after receiving POST request and headers, recognizes that a portion of the object was previously received and is stored in its memory. It then returns a Response, with a new extension header, (called "Partial-Length=xxx"), indicating the portion of the object and the offset of the object that the client should begin at. The client, after receiving the above response, sends the remaining portion of the object using a new POST request. If server is closing the connection due to HTTP Request timeout (408), the server may send a "Partial-length=XXX" extension header, indicating the amount of data received thus far and saved as a partial object.

Protocol Extensions for Client to Indicate Intended Upload & Size to Server and Transit Network Elements The present disclosure also includes extensions to user plane RAN protocols, such as GTP-U in UMTS, S1-U in LTE, to propagate sector information, the user's downstream CQI, and upstream Signal to Noise Ratio (SNR). The user device, the base station (NodeB, eNodeB), or the RNC populates the extension fields to indicate "user's sector", user's uplink and downlink channel quality. While such information is available in the control plane in the current RAN protocols, such information is not available in User Plane. If the information, such as sector load is known in the UE, it could include that in the HTTP Request using extension headers, thus propagating the information to the source. If the information, such as uplink channel quality or number of users contending for upstream bandwidth is unknown in the UE, and only known in the NodeB or RNC, when such information is propagated via GTP-U extensions, the core network device, such as GGSN or PGW that terminates user plane GTP-U tunnels, could add extension headers to user plane IP or other protocol headers and propagate to Server. On receiving the user's CQI or the sector utilization level, the server may select contents (alternative resolutions of content) based on the network capacity currently available to the user.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of monitoring and improving the quality of experience for one or more users in a mobile cellular network, comprising:
    monitoring network behavior on said mobile cellular network;
    determining a quality of experience metric for a plurality of activities based on said monitored network behavior, said activities selected from the group consisting of SMS messaging, web browsing, multimedia downloads, multimedia uploads, advertisement delivery, voice calls, and paging;
    consolidating, for a particular user, said plurality of said determined quality of experience metrics, to generate a consolidated QoE metric for said user;
    exporting said consolidated QoE metric to a component in said mobile cellular network, wherein said components takes an action based on said consolidated QoE metric to improve a quality of experience for said user.

2. The method of claim 1, wherein said activity comprises web browsing, and said quality of experience metric is determined by:
    identifying a start of a browsing session based on establishment of said user's TCP connection to a server;
    identifying an end of said browsing session when a significant idle time where there is no uplink or downlink traffic to said TCP connection;
    determining a duration of said browsing session;
    determining a number of bytes delivered during said browsing session; and
    determining a quality of experience for web browsing based on said number of bytes or objects delivered and said duration of browsing session.

3. The method of claim 1, wherein said activity comprises web browsing, and said quality of experience metric is determined by:
    estimating page down load time by identifying a time period between a top level domain request to a subsequent top level domain request;
    estimating an amount of data downloaded during said time period; and
    determining a quality of experience for web browsing based on said amount of downloaded data and said time period.

4. The method of claim 1, wherein said activity comprises web browsing, and said quality of experience metric is determined by:
    estimating a non-idle time user throughput; and
    determining a quality of experience for web browsing based on said non-idle time user throughput.

5. The method of claim 4, wherein said non-idle time user throughput is estimated by counting a number of bytes acknowledged per TCP connection over a fixed time interval.

6. The method of claim 1, wherein said activity comprises SMS messaging, and said quality of experience metric is determined by:
    monitoring a plurality of parameters, said parameters selected from the group consisting of a round trip interval from a service request to a SMS-submit; a number of service request retries; a number of paging retries; a time between a Type1-paging message and an associated paging response; round trip time between sending a Type1-paging message and receiving a CP-ACK; and estimated delivery completion based on a time between sending a message to a SMS server and receiving a delivery notification completion; and
    combining said parameters to estimate a quality of experience for SMS service.

7. The method of claim 1, wherein said activity comprises multimedia downloads, and said quality of experience metric is determined by:
    estimating, based on a time between a client request for content, and a corresponding acknowledgement from a content server, a number of times a keep-ahead buffer in said client is empty; and
    determining a quality of experience for multimedia download based on said number.

8. The method of claim 1, further comprising combining consolidated QoE metrics for a plurality of users located in a common geographic region prior to taking said action.

9. The method of claim 8, wherein said action comprises using a microcell or femtocell in said common geographic region if said combined consolidated QoE metric is below a predetermined threshold.

10. The method of claim 8, wherein said action comprises moving said plurality of users to an alternative network.

11. The method of claim 1, further comprising combining consolidated QoE metrics for a plurality of users accessing a common website prior to taking said action.

12. The method of claim 11, wherein said action comprises introducing caching or site acceleration improvements.

13. The method of claim 1, further comprising combining consolidated QoE metrics for a plurality of users using a common device class prior to taking said action.

14. The method of claim 13, wherein said action comprises diagnosing a potential compatibility issue with said device class.

* * * * *